United States Patent
Inagaki et al.

(10) Patent No.: US 11,230,003 B2
(45) Date of Patent: Jan. 25, 2022

(54) ROBOT SYSTEM CONFIGURED TO PERFORM LEARNING CONTROL

(71) Applicant: FANUC CORPORATION, Yamanashi (JP)

(72) Inventors: Satoshi Inagaki, Yamanashi (JP); Hajime Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 271 days.

(21) Appl. No.: 16/445,212

(22) Filed: Jun. 19, 2019

(65) Prior Publication Data

US 2020/0171654 A1 Jun. 4, 2020

(30) Foreign Application Priority Data

Jun. 26, 2018 (JP) .............................. JP2018-120684

(51) Int. Cl.
*B25J 9/16* (2006.01)
*G06F 17/14* (2006.01)

(52) U.S. Cl.
CPC ............ *B25J 9/163* (2013.01); *B25J 9/1653* (2013.01); *G06F 17/14* (2013.01)

(58) Field of Classification Search
CPC ........ B25J 9/163; B25J 9/1653; B25J 9/1638; B25J 13/08; B25J 9/1633; G06F 17/14; G05B 2219/41166; G05B 2219/39195; G05B 19/404; G05B 2219/39352; G05B 2219/39295; G01M 7/022
See application file for complete search history.

(56) References Cited

U.S. PATENT DOCUMENTS

| | | | | |
|---|---|---|---|---|
| 5,012,428 A | * | 4/1991 | Ueno | .................... G01M 7/022 700/280 |
| 2011/0208356 A1 | * | 8/2011 | Kato | ....................... B25J 9/163 700/253 |
| 2013/0234642 A1 | * | 9/2013 | Igarashi | .............. H02P 23/0004 318/611 |

(Continued)

FOREIGN PATENT DOCUMENTS

| JP | 3091625 B2 | * | 9/2000 |
|---|---|---|---|
| JP | 201 1-167817 A | | 9/2011 |

(Continued)

*Primary Examiner* — Abby Y Lin
*Assistant Examiner* — Danielle Marie Jackson
(74) *Attorney, Agent, or Firm* — Hauptman Ham, LLP

(57) ABSTRACT

A robot system includes: a learning control unit configured to perform learning for calculating a learning correction amount for bringing a position of a control target portion toward a target position; a robot control unit configured to control the operation of the robot mechanism unit; a power spectrum calculating unit configured to calculate a power spectrum of a vibration data of the control target portion; a comparison unit configured to compare each power spectrum between at the time of the current learning and at the time of the immediately preceding learning; and a learning correction amount updating unit configured to adjust at least one of a phase and a gain of the learning correction amount used at the time of the current learning to set the adjusted learning correction amount as a new learning correction amount used at the time of next learning.

9 Claims, 18 Drawing Sheets

(56) References Cited

U.S. PATENT DOCUMENTS

| | | | |
|---|---|---|---|
| 2015/0148956 A1* | 5/2015 | Negishi | B25J 9/163 |
| | | | 700/253 |
| 2016/0233808 A1* | 8/2016 | Yoshiura | H02P 23/14 |
| 2018/0224830 A1* | 8/2018 | Iijima | G05B 19/39 |

FOREIGN PATENT DOCUMENTS

| | | |
|---|---|---|
| JP | 2011224662 A | 11/2011 |
| JP | 2013121625 A | 6/2013 |
| JP | 201430857 A | 2/2014 |
| JP | 2017127964 A | 7/2017 |

\* cited by examiner

ROBOT SYSTEM CONFIGURED TO PERFORM LEARNING CONTROL

RELATED APPLICATIONS

The present application claims priority of Japanese Application Number 2018-120684, filed Jun. 26, 2018, the disclosure of which is hereby incorporated by reference herein in its entirety.

BACKGROUND OF THE INVENTION

1. Field of the Invention

The present invention relates to a robot system configured to perform learning control.

2. Description of the Related Art

In an industrial robot system, if the operation of the robot is speeded up to shorten the tact time, the production efficiency of the robot system is improved. However, if the speed of the operation of the robot is increased to a certain extent or more, vibrations are generated in an end effector such as a servo gun located at the tip of the robot, or the like, due to factors such as insufficient rigidity of the reduction gear or the robot arm. In particular, in recent years, weight reduction of the end effector has been carried out to further improve productivity, so that vibration due to a lack of rigidity of the end effector is no longer negligible. For this reason, there has been proposed a robot system, in which an acceleration sensor is attached to a control target portion (e.g., end effector) where vibration elimination is required, vibration of the control target portion during robot operation is measured by the sensor, and vibration is reduced by performing learning control.

For example, as described in Japanese Unexamined Patent Application Publication No. 2011-167817, there is known a robot including a robot mechanism unit provided with a sensor at a target portion for position control and a control device configured to control the operation of the robot mechanism unit. In the robot, the control device includes a normal control unit configured to control an operation of the robot mechanism unit and a learning control unit configured to operate the robot mechanism unit by a work program and to perform learning to calculate a learning correction amount so as to approximate a control target position of the robot mechanism unit detected by the sensor to a target trajectory or a position provided to the normal control unit, and the learning control unit calculates the maximum speed override which can be set in the learning operation state and calculates the learning correction amount by increasing the speed override a plurality of times until the maximum speed override is reached.

SUMMARY OF THE INVENTION

In a robot system which reduces vibration by performing learning control, for example, in a case of designing a learning controller from frequency response data, it takes time and effort to measure frequency response. Moreover, since it is difficult to actually acquire frequency response data in the field where the robot system is provided, a learning controller designed in advance on the basis of frequency response data for a representative end effector is also used for other end effectors. In this case, if the resonance frequency of the end effector actually used is greater than the control band of the learning controller, the vibration can be reduced by the learning controller. However, in a case that the rigidity of the end effector actually used is low, and the resonance frequency thereof is included in the control band of the learning controller, the phase is delayed in the learning controller, and the gain is increased, whereby a problem occurs where the vibration diverges. Therefore, there is a need for a technique which can accurately and easily remove the vibration of a control target portion by learning control.

According to an aspect of the present disclosure, a robot system having a robot mechanism unit including a sensor configured to acquire vibration data of a control target portion and a robot control device configured to control an operation of the robot mechanism unit according to an operation program, includes a learning control unit configured to perform learning for calculating a learning correction amount for bringing a position of the control target portion detected by the sensor toward a target position during the operation of the robot mechanism unit, and a robot control unit configured to correct an operation command regarding the target position of the control target portion by using the learning correction amount calculated by the learning control unit and to control the operation of the robot mechanism unit, wherein the learning control unit includes a power spectrum calculating unit configured to calculate a power spectrum by Fourier transforming vibration data detected by the sensor for each learning cycle by the learning control unit, a comparison unit configured to compare, for each frequency component, a power spectrum at the time of the current learning and a power spectrum at the time immediately preceding learning calculated by the power spectrum calculating unit, and a learning correction amount updating unit, in a case that as a result of comparison by the comparison unit, there exists a frequency component for which the power spectrum at the time of the current learning is greater than the power spectrum at the time immediately preceding learning, configured to adjust at least one of a phase and a gain of the learning correction amount used for correcting the operation command at the time of the current learning such that the power spectrum at the time of the current learning becomes less than the power spectrum at the time of the immediately preceding learning and to set the adjusted learning correction amount as a new learning correction amount used for correcting an operation command at the time of the next learning.

BRIEF DESCRIPTION OF THE DRAWINGS

The invention will be more clearly understood with reference to the following accompanying drawings.

DETAILED DESCRIPTION

Figure 1:
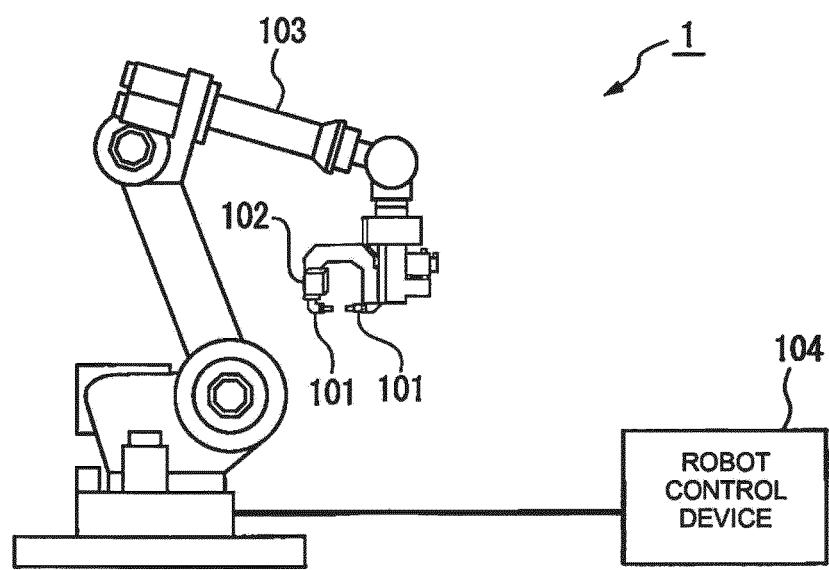
FIG. 1 is a schematic view of a robot system according to an embodiment of the present disclosure.

A robot system configured to perform learning control will be described below with reference to the drawings. The drawings are scaled appropriately to facilitate understanding. Embodiments illustrated in the drawings are an example for implementation, and the disclosure is not limited to the embodiments illustrated.

FIG. 1 is a schematic view of a robot system according to an embodiment of the present disclosure. A robot system 1 includes a robot mechanism unit 103 including a sensor 102 configured to acquire vibration data of a control target portion 101 such as an end effector which is a target of position control and a robot control device 104 configured to control the operation of the robot mechanism unit 103 according to an operation program. The robot system 1 is configured to perform learning control for the vibration of the control target portion 101. Furthermore, the robot system 1 includes a display device (not illustrated) configured to display various information.

The sensor 102 is attached to the control target portion 101 located at tip of the wrist of the robot mechanism unit 103. The sensor 102 is a sensor configured to detect information (e.g., acceleration, angular velocity, strain (electrical resistance value), or the like) for which calculation processing for estimating the position of the control target portion 101 is required. Examples of the sensor 102 include an acceleration sensor, a gyro sensor, an inertial sensor, a force sensor, a laser tracker, a camera, or a motion capture.

The sensor 102, the robot mechanism unit 103, the robot control device 104, and the display device (not illustrated) are communicably connected to each other via a wired or wireless connection.

Figure 2:
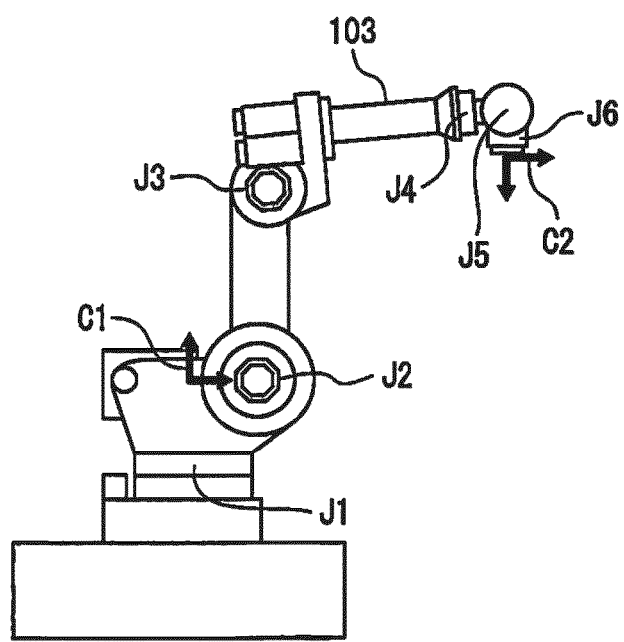
FIG. 2 is a configuration diagram of a robot mechanism unit according to an embodiment of the present disclosure.

FIG. 2 is a configuration diagram of a robot mechanism unit according to an embodiment of the present disclosure. The robot mechanism unit 103 includes six joint shafts J1 to J6 each including a servo motor or a reduction gear. The robot mechanism unit 103 is a robot manipulator which a world coordinate system C1 fixed in space and a mechanical interface coordinate system C2 at the flange position of the joint shafts J6 are defined.

Figure 3:
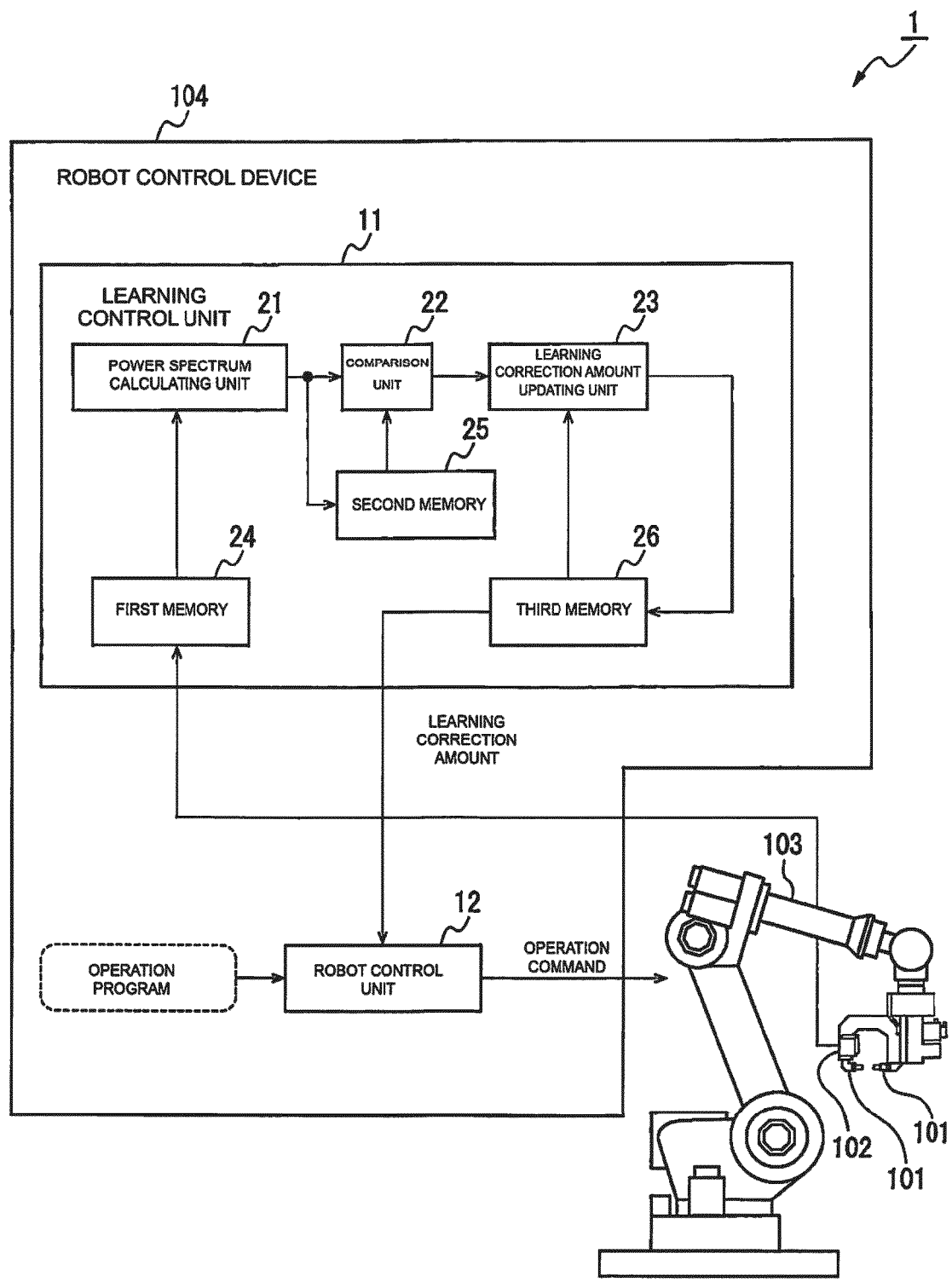
FIG. 3 is a block diagram illustrating a robot system according to an embodiment of the present disclosure.

FIG. 3 is a block diagram illustrating a robot system according to an embodiment of the present disclosure.

The robot system 1 in the embodiment of the present disclosure includes a learning control unit 11 and a robot control unit 12. The learning control unit 11 and the robot control unit 12 include a known CPU, an ASIC, or an FPGA.

The learning control unit 11 is configured to perform learning to calculate a learning correction amount for bringing the position of the control target portion 101 detected by the sensor 102 toward the target position while the robot mechanism unit 103 operates according to the operation program. Also, the learning in the learning control unit 11 may be performed online or may be performed offline.

The learning control unit 11 is designed such that the vibration monotonically decreases for each learning cycle on the basis of frequency response data for a representative control target portion (end effector). That is, the learning control unit 11 is not set on the basis of the frequency response data to the actual control target portion 101 by the robot mechanism unit 103. Therefore, whether or not the vibration of the control target portion 101 can be eliminated by the learning control of the learning control unit 11 depends on whether or not the actual control target portion 101 by the robot mechanism unit 103 is included in the control band of the learning control unit 11 designed on the basis of the frequency response data for an representative control target portion (end effector). This will be described later with reference to FIG. 5 to FIG. 8.

The robot control unit 12 corrects an operation command regarding the target position of the control target portion 101 by using the learning correction amount calculated by the learning control unit 11 and controls the operation of the robot mechanism unit 103, according to the operation program.

Figure 4:
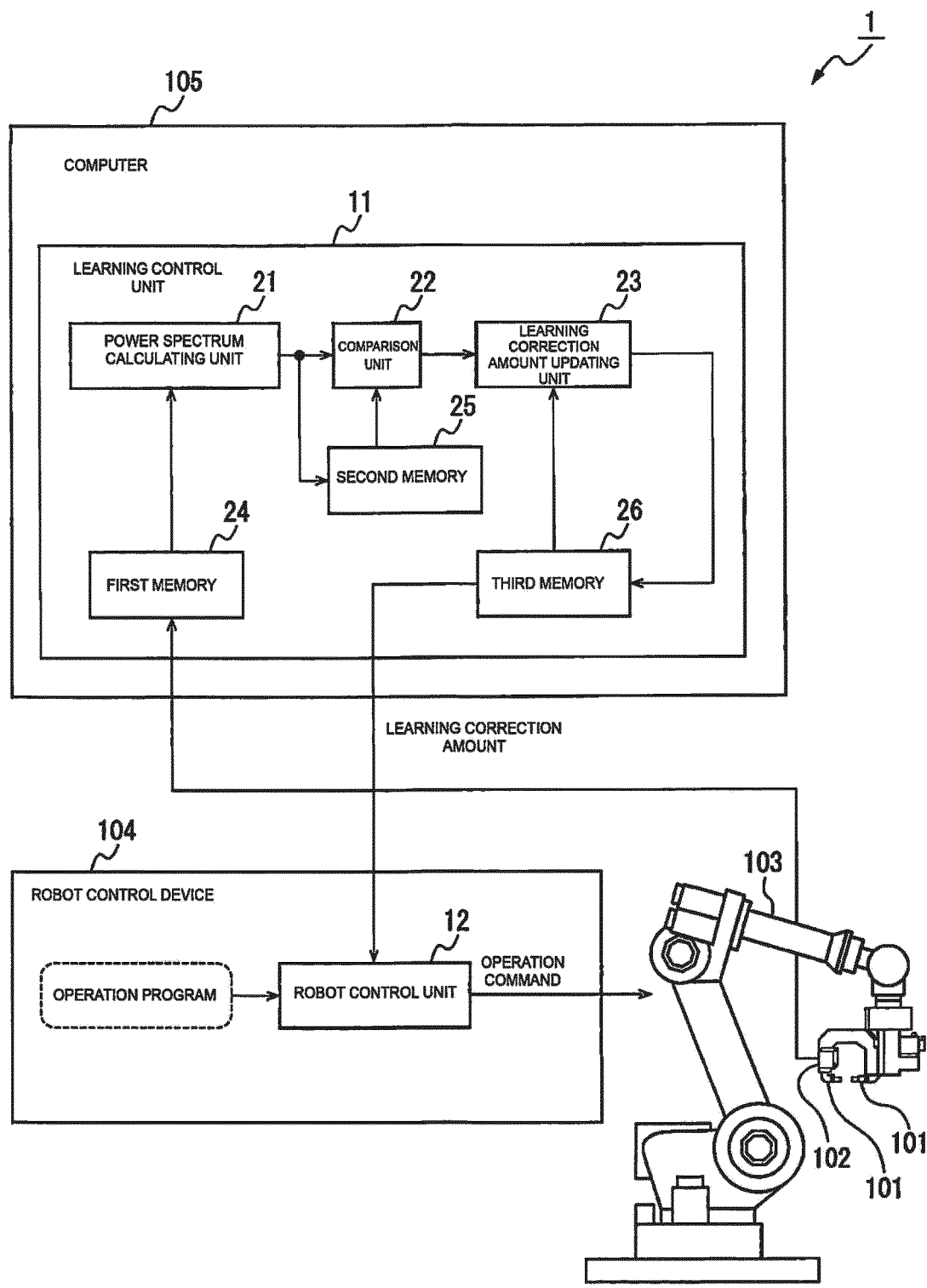
FIG. 4 is a block diagram illustrating a robot system according to another embodiment of the present disclosure.

In the robot system 1 according to an embodiment illustrated in FIG. 3, the learning control unit 11 and the robot control unit 12 are provided in the robot control device 104. In another embodiment, the learning control unit 11 may be provided in a computer separate from the robot control device 104. FIG. 4 is a block diagram illustrating a robot system according to another embodiment of the present disclosure. That is, in the robot system 1 according to one embodiment illustrated in FIG. 4, the robot control device 104 and the computer 105 are communicably connected via a wire or a wireless communication, and the learning control unit 11 and the robot control unit 12 are provided in the computer 105.

In a case that the robot mechanism unit 103 is operated on the basis of the operation command regarding the target position of the control target portion 101 under the control of the robot control unit 12, the sensor 102 detects the vibration of the robot mechanism unit 103, and the learning control unit 11 performs learning control to reduce this vibration. That is, the learning control unit 11 executes an operation program which is a target of learning control and records acceleration data during operation of the robot mechanism unit 103 and a command position by the robot at that time. In a case that the operation program which is a target of learning control is completed once, the amount of vibration in each control cycle in a case that the operation program is executed and the amount of learning correction for canceling the amount of vibration are calculated and then recorded in a memory in the learning control unit 11. The learning correction amount recorded in the memory is used to correct the operation command in the robot control unit 12 in a case that the same operation program is subsequently executed. By repeatedly executing this series of processes, the vibration of the robot mechanism unit 103 continues to be reduced.

Next, the relationship between the resonance frequency of the control target portion (end effector) and the control band of the learning control unit will be described with reference to FIG. 5 to FIG. 8.

Figure 5:
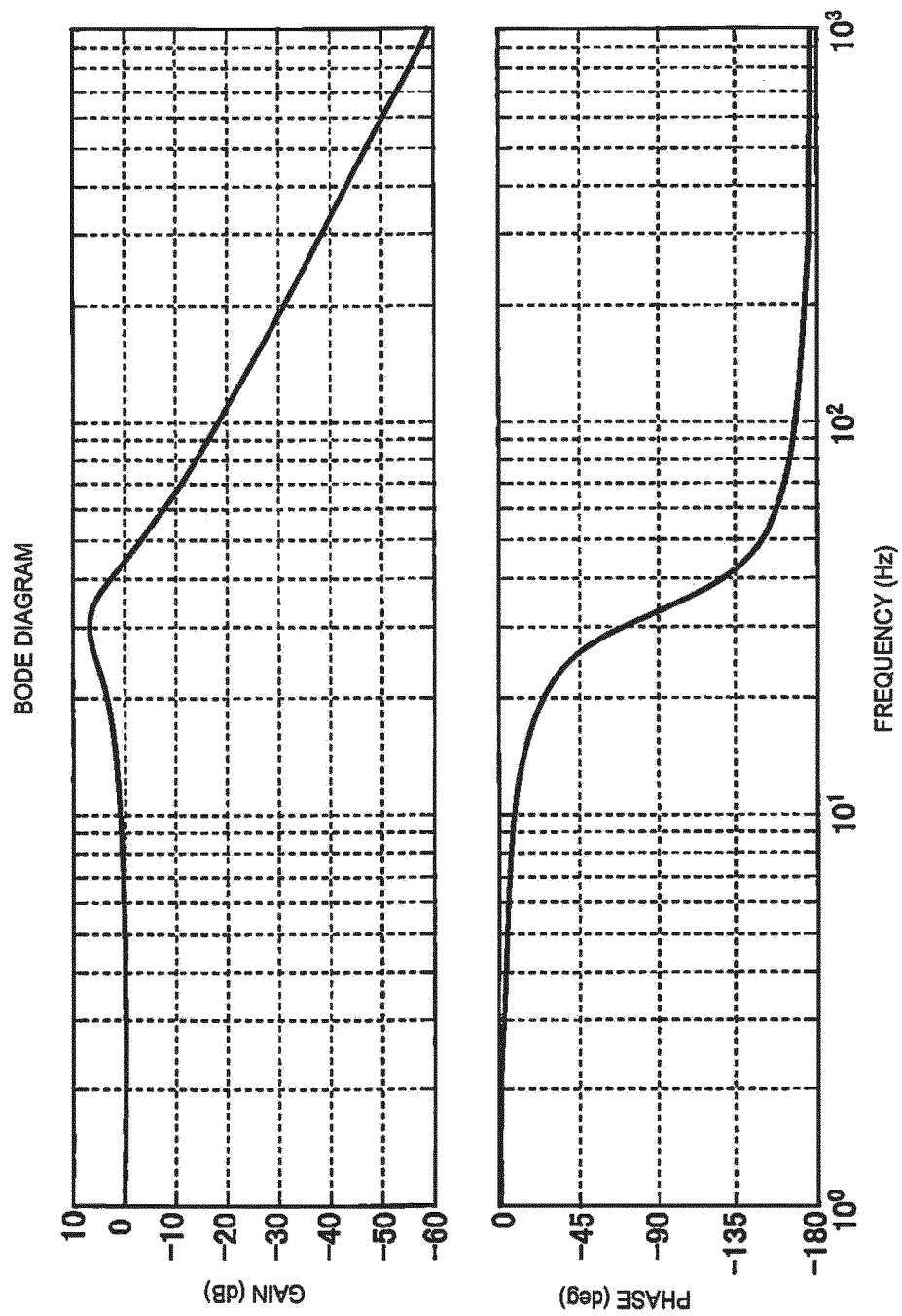
FIG. 5 is a Bode diagram showing an example of the frequency characteristics of a control target portion in a case that a resonance frequency of the control target portion is greater than a control band of a learning control portion.
Figure 6:
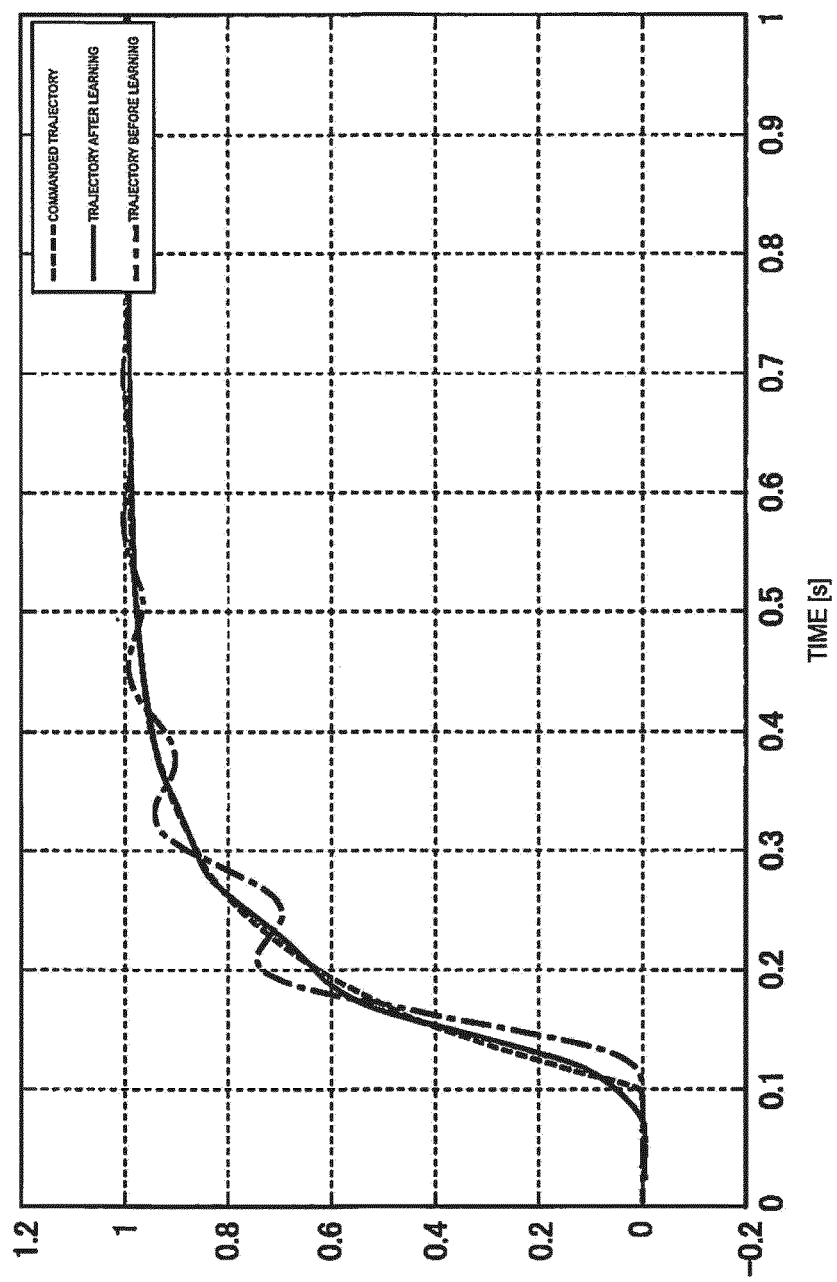
FIG. 6 is a diagram showing an example of the vibration of a control target portion having the frequency characteristics shown in FIG. 5.

FIG. 5 is a Bode diagram showing an example of the frequency characteristics of a control target portion in a case that a resonance frequency of the control target portion is greater than a control band of a learning control portion. FIG. 6 is a diagram showing an example of the vibration of a control target portion having the frequency characteristics shown in FIG. 5. In FIG. 6, a horizontal axis is a time axis, and a vertical axis indicates the amplitude of vibration. Further, in FIG. 6, a dotted line indicates a command trajectory of the control target portion, a one dot chain line indicates a trajectory of the control target portion before learning control, and a solid line indicates a trajectory of the control target portion after learning control. In a case that a learning control unit having a control band of 15 Hz is applied to a control target portion having a resonance frequency of, for example, 30 Hz as shown in FIG. 5, the vibration monotonically decreases every learning cycle as shown by a solid line in FIG. 6.

Figure 7:
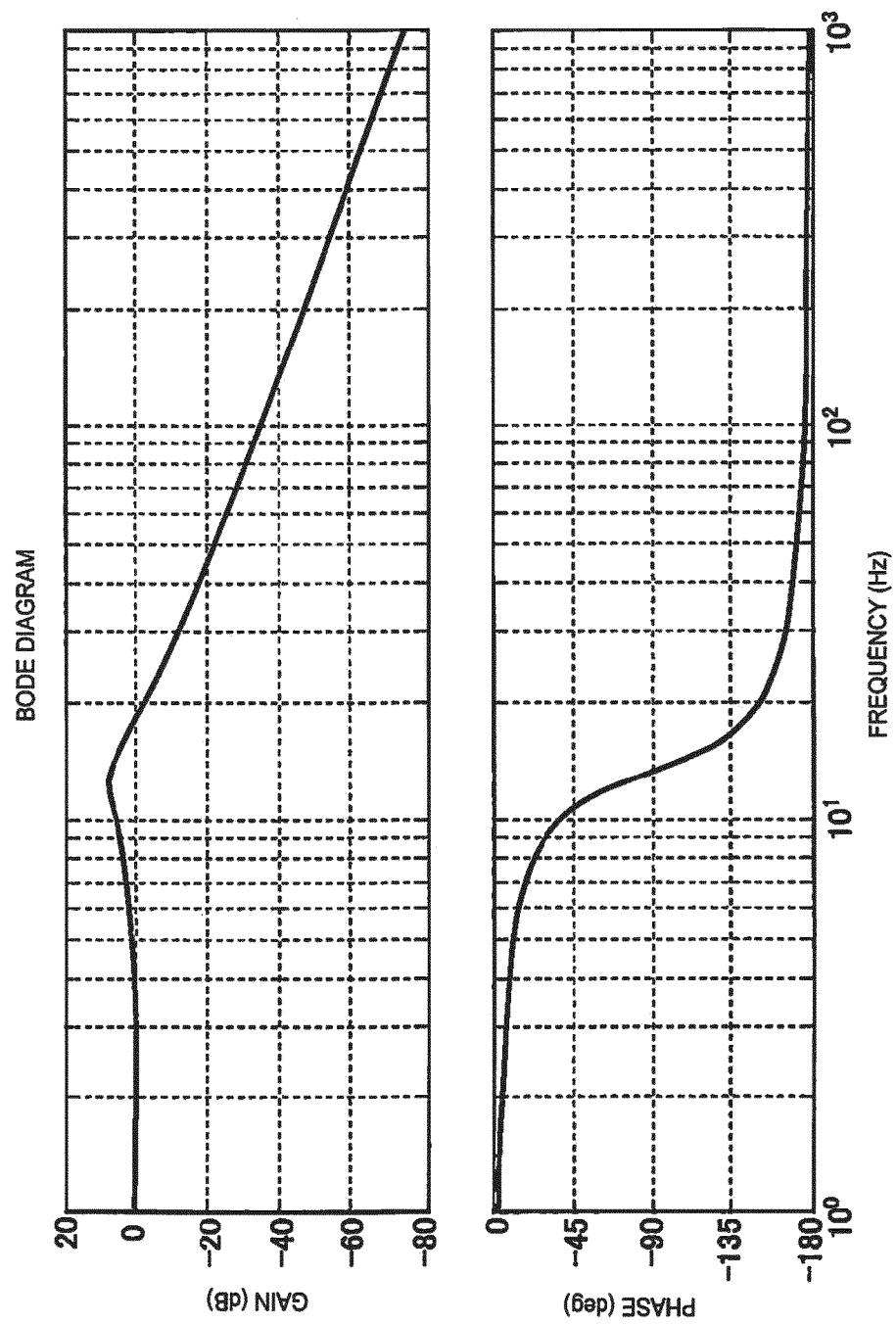
FIG. 7 is a Bode diagram showing an example of the frequency characteristics of a control target portion in a case that a resonance frequency of the control target portion is included in a control band of the learning control portion.
Figure 8:
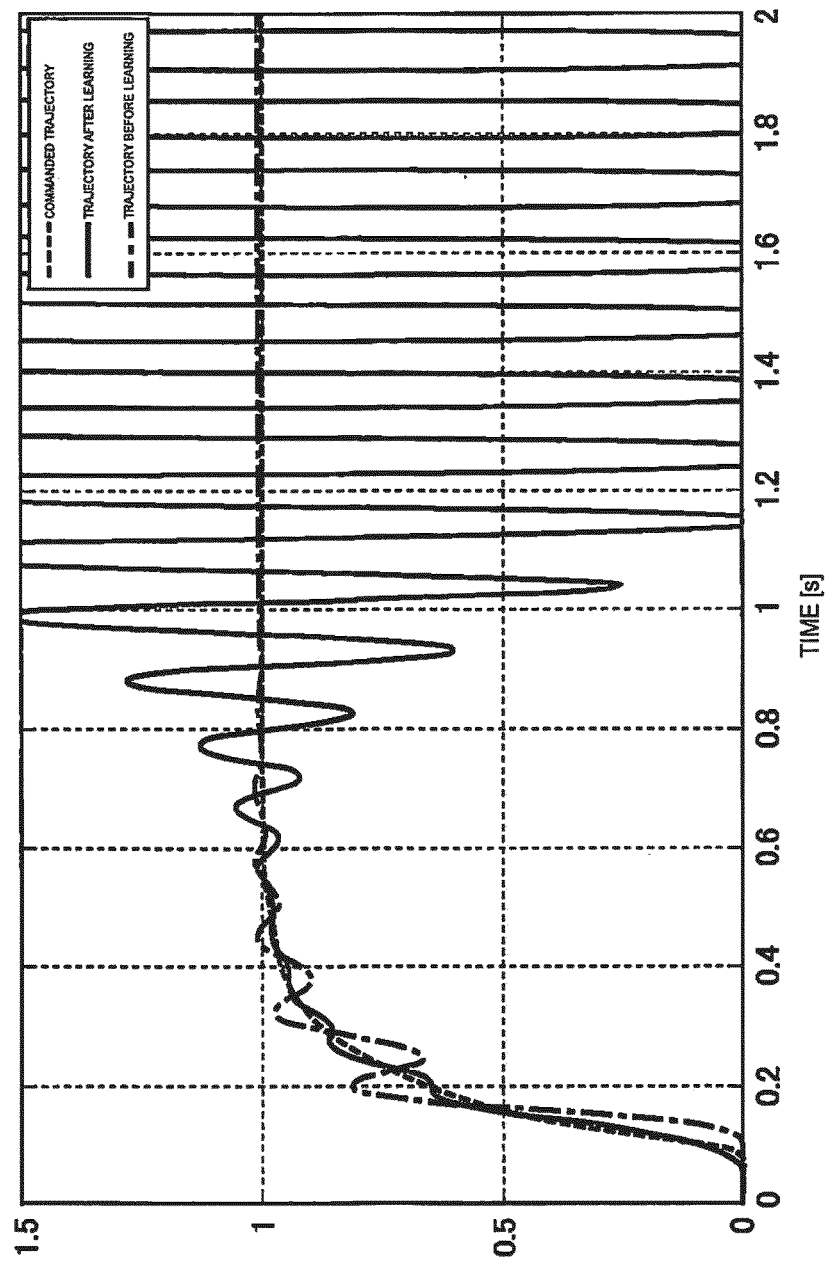
FIG. 8 is a diagram showing an example of the vibration of a control target portion having the frequency characteristics shown in FIG. 7.

FIG. 7 is a Bode diagram showing an example of the frequency characteristics of a control target portion in a case that a resonance frequency of the control target portion is included in a control band of the learning control portion. FIG. 8 is a diagram showing an example of the vibration of a control target portion having the frequency characteristics shown in FIG. 7. In FIG. 8, a horizontal axis is a time axis, and a vertical axis indicates the amplitude of vibration. Further, in FIG. 8, a dotted line indicates a command trajectory of the control target portion, a one dot chain line indicates a trajectory of the control target portion before learning control, and a solid line indicates a trajectory of the control target portion after learning control. In a case that a learning control unit having a control band of 15 Hz is applied to a control target portion having a resonance frequency of 14 Hz, for example, as shown in FIG. 7, the vibration diverges as shown by a solid line in FIG. 8.

In the case that the resonance frequency of the control target portion is included in the control band of the learning control unit, the vibration is not reduced but diverged as shown in FIG. 8, which is considered due to a phase delay or a gain increase near the resonance frequency of the control target portion. Therefore, in the present embodiment, the power spectrum of the vibration of the control target portion 101 is monitored for each learning cycle by the learning control unit 11, and in a case that the power spectrum of the vibration of the control target portion 101 increases at the time of the current learning as compared to the power spectrum at the time of the immediately preceding learning, it is considered that the resonance frequency of the control target portion 101 is included in the control band of the learning control unit 11, and at least one of the phase and the gain of the learning correction amount is adjusted in the learning control unit 11, and the adjusted learning correction amount is set as a new learning correction amount used for correcting an operation command at the time of next learning.

Next, the configuration of the learning control unit 11 will be described more specifically.

As illustrated in FIGS. 3 and 4, the learning control unit 11 includes a power spectrum calculating unit 21, a comparison unit 22, and a learning correction amount updating unit 23.

Also, the learning control unit 11 includes a first memory 24, a second memory 25, and a third memory 26. The first memory 24 stores sensor information acquired from the sensor 102. The second memory 25 stores the power spectrum calculated (acquired) by the power spectrum calculating unit 21. The third memory 26 stores a learning correction amount converged by repeating learning. The first memory 24 and the second memory 25 are preferably volatile memories for high-speed learning, but may be nonvolatile memories. The first memory 24 and the second memory 25 may be allocated to each area divided in one memory, or may be implemented as separate memories. Moreover, the third memory 26 is preferably a non-volatile memory which stores the learning correction amount even after the power is turned off. After the power is turned on, the converged learning correction amount is read out from the third memory 26 and used in the robot control unit 12.

The power spectrum calculating unit 21 performs Fourier transform on the vibration data detected by the sensor 102 to calculate (acquire) a power spectrum for each learning cycle by the learning control unit 11. The power spectrum calculated by the power spectrum calculating unit 21 is sent to the comparison unit 22 and stored in the second memory 25.

The comparison unit 22 compares, for each frequency component, the magnitude relationship between the power spectrum at the time of the current learning and the power spectrum at the time of the immediately preceding learning, which are calculated by the power spectrum calculating unit 21. The power spectrum at the time of the current learning is the one sent from the power spectrum calculating unit 21 in the current learning cycle, and the power spectrum at the time of the immediately preceding learning is the one read out from the second memory 25. Information on the magnitude relationship of the power spectrum for each frequency component, which is the result of the comparison by the comparison unit 22, is sent to the learning correction amount updating unit 23.

In a case that there exists, as a result of comparison by the comparison unit 22, a frequency component for which the power spectrum at the time of the current learning is greater than the power spectrum at the time of the immediately preceding learning, the learning correction amount updating unit 23 adjusts at least one of the phase and the gain of the learning correction amount used for correcting the operation command at the time of the current learning such that the power spectrum at the time of the current learning becomes less than the power spectrum at the time of the immediately preceding learning and sets the adjusted learning correction amount as a new learning correction amount used for correcting the operation command at the time of next learning. That is, the learning correction amount updating unit 23 adjusts the phase of the frequency component, of the learning correction amount, corresponding to the frequency component at the time of the current learning which is determined by the comparison unit 22 that the power spectrum at the time of the current learning is greater than the power spectrum at the time of the immediately preceding learning, so that the power spectrum at the time of the current learning for the large frequency component becomes equal to or less than the power spectrum at the time of the immediately preceding learning, and sets the adjusted learning correction amount as a new learning correction amount to be used for the correction of the operation command at the time of next learning. The newly set learning correction amount is stored in the third memory 26. The robot control unit 12 corrects the operation command regarding the target position of the control target portion 101 by using the learning correction amount read from the third memory 26 in the learning control unit 11 according to the operation program and controls the operation of the robot mechanism unit 103.

Next, an embodiment in which the phase of the learning correction amount is adjusted will be described more specifically with reference to FIG. 9 and FIG. 10. An embodiment in which both the phase and the gain of the learning correction amount are adjusted will be described later.

Figure 9:
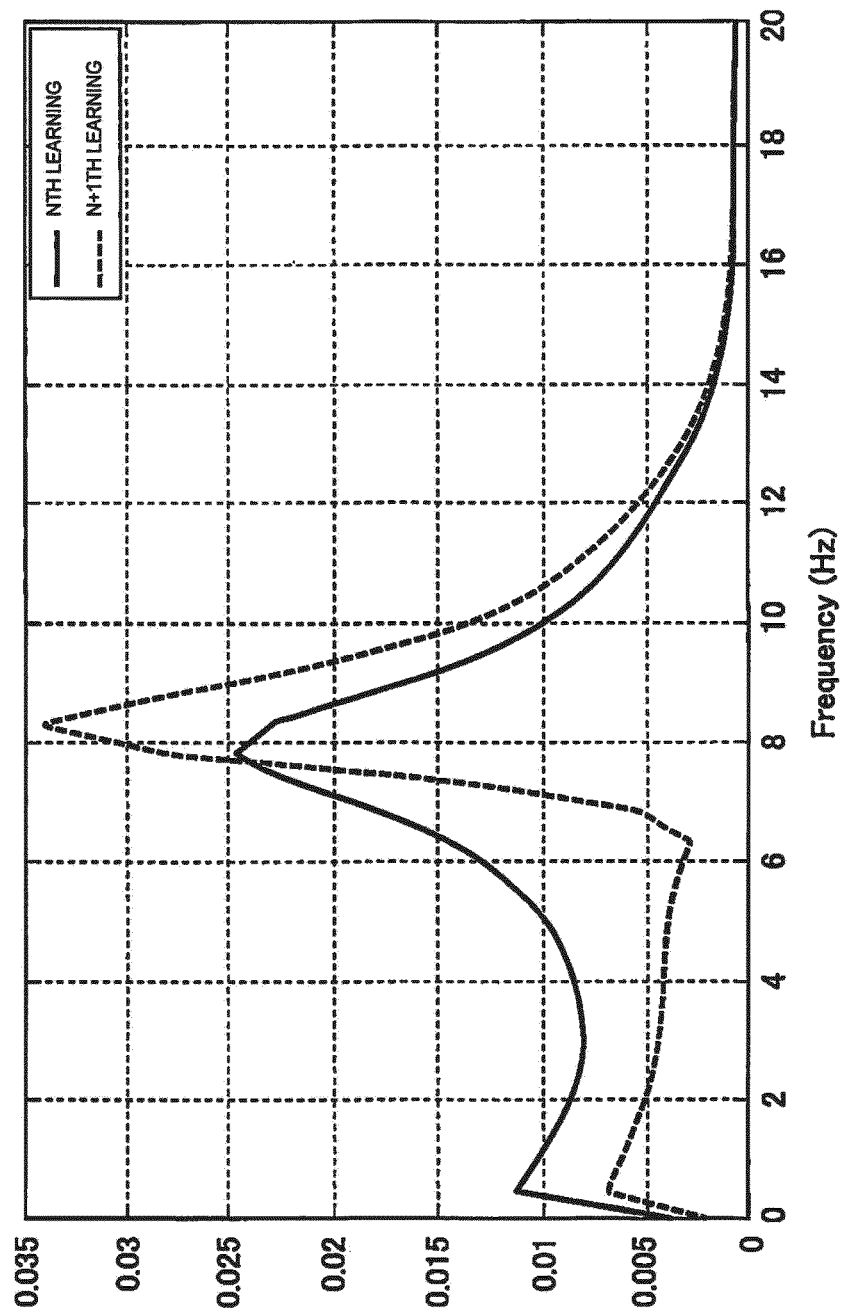
FIG. 9 is a diagram showing a power spectrum of vibration of a control target portion in a case that a resonance frequency of the control target portion is included in a control band of the learning control portion.
Figure 10:
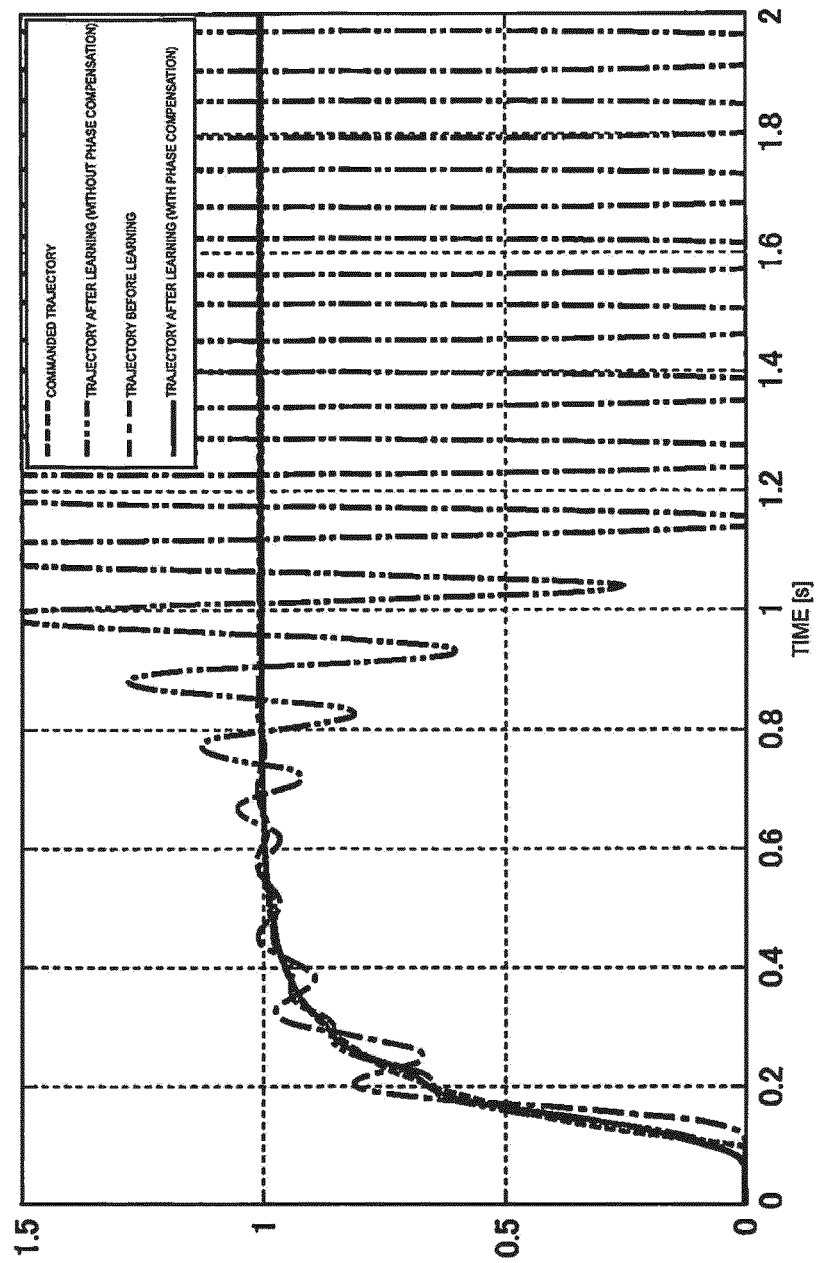
FIG. 10 is a diagram showing an example of the vibration of the control target portion having the power spectrum of the vibration shown in FIG. 9.

FIG. 9 is a diagram showing the power spectrum of the vibration of the control target portion in a case that a resonance frequency of a control target portion is included in a control band of the learning control portion. In FIG. 9, a horizontal axis represents frequency, and a vertical axis represents power spectrum. Further, in FIG. 9, the solid line indicates the power spectrum of the vibration of the control target portion 101 at the Nth time (N is an integer) of the learning control unit 11, and the dotted line indicates the power spectrum of the vibration of the control target portion 101 at the N+1th time (N is an integer) of the learning control unit 11. FIG. 10 is a diagram showing an example of the vibration of the control target portion having the power spectrum of the vibration shown in FIG. 9. In FIG. 10, a horizontal axis is a time axis, and a vertical axis indicates the amplitude of vibration. Further, in FIG. 10, a dotted line indicates the commanded trajectory of the control target portion, a one dot chain line indicates the trajectory of the control target portion before learning control, and a two dot chain line indicates the trajectory of the control target portion after learning control without phase adjustment, and a solid line indicates the trajectory of the control target portion after learning control with phase adjustment. In the examples shown in FIG. 9 and FIG. 10, the control band of the learning control unit 11 is set to be 15 Hz, as an example. In a case that the resonance frequency of the control target portion 101 is included within 15 Hz, which is the control band of the learning control unit 11, the power spectrum at the time of the current learning (N+1th cycle), as a result of learning control by the learning control unit 11, increases compared to the power spectrum at the time of the immediately preceding learning (Nth cycle). That is, as shown in FIG. 9, for frequency components greater than 8 Hz, the power spectrum at the time of the current learning (N+1th time) is greater than the power spectrum at the time of the immediately preceding learning. As a result, as shown in FIG. 10, although there is no vibration before learning control (solid line), the vibration is diverged by learning control of the learning control unit 11 (two dotted lines). Here, in a case that the phase is adjusted to advance with respect to the learning correction amount for the frequency component greater than 8 Hz such that the power spectrum of the frequency component greater than 8 Hz at the time of the current learning becomes less than the power spectrum of the frequency component greater than 8 Hz at the time of the immediately preceding learning, the vibration monotonically decreases with each learning cycle as shown by the solid line in FIG. 10. In this embodiment, the power spectrum of the vibration of the control target portion 101 is monitored for each learning cycle by the learning control unit 11, and in a case that the power spectrum of the vibration of the control target portion 101 increases at the time of the current learning as compared to the power spectrum at the time of the immediately preceding learning, the learning correction amount updating unit 23 adjusts the phase of the learning correction amount such that the power spectrum at the time of the current learning becomes less than the power spectrum at the time of the immediately preceding learning, and sets the adjusted learning correction amount as a new learning correction amount. The new learning correction amount is stored in the third memory 26. The robot control unit 12 corrects the operation command regarding the target position of the control target portion 101 by using the new learning correction amount read from the third memory 26 in the learning control unit 11 according to the operation program and controls the operation of the robot mechanism unit 103. Since the new learning correction amount is set such that the power spectrum at the time of the current learning is made less than the power spectrum at the time of the immediately preceding learning, in a case that the robot control unit 12 corrects the operation command with the new learning correction amount to control the operation of the robot mechanism unit 103, the vibration monotonically decreases for each learning cycle.

Figure 11:
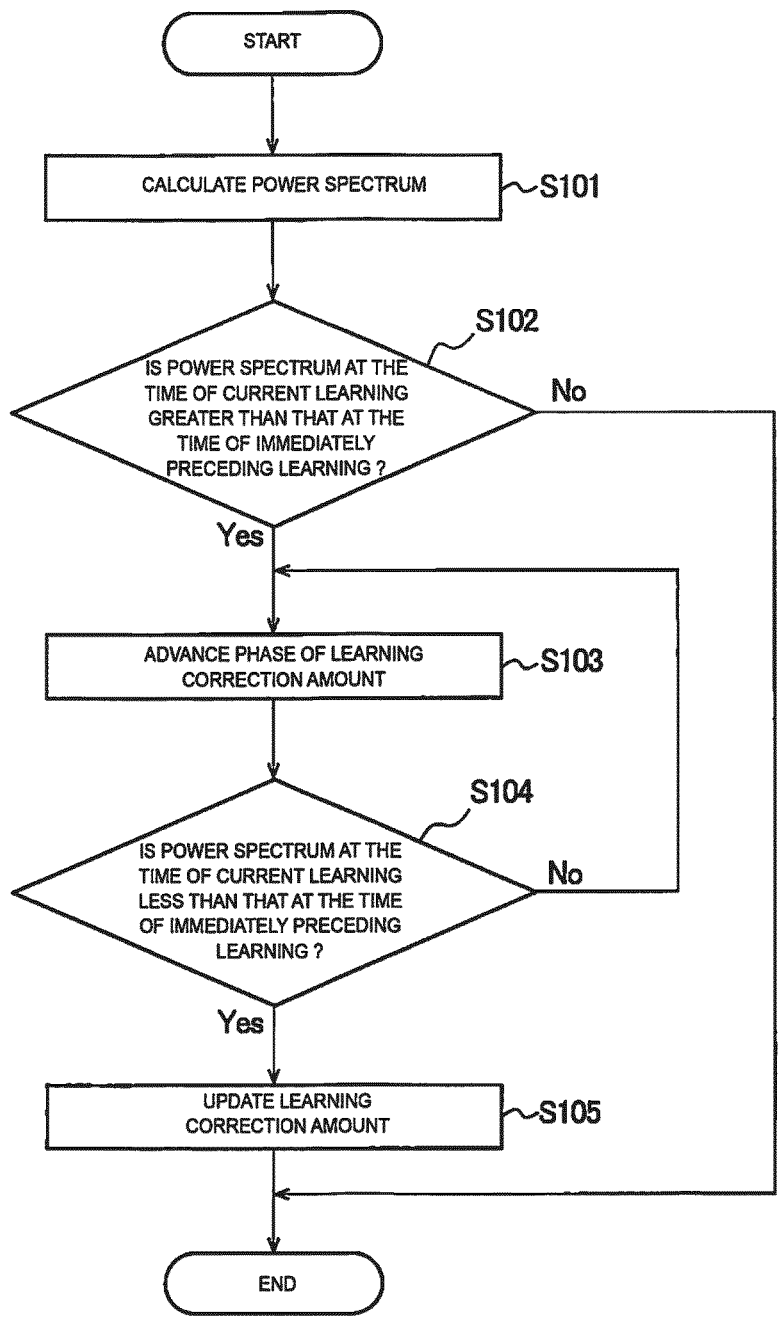
FIG. 11 is a flow chart illustrating a learning correction amount updating process in a robot system according to an embodiment of the present disclosure.

FIG. 11 is a flow chart illustrating a learning correction amount updating process in a robot system according to an embodiment of the present disclosure.

A case is considered in which the robot control unit 12 controls the operation of the robot mechanism unit 103 by correcting the operation command by using the learning correction amount calculated by the learning control unit 11. In step S101, the power spectrum calculating unit 21 performs Fourier transform on data of vibration detected by the sensor 102 to calculate a power spectrum. The power spectrum calculated by the power spectrum calculating unit 21 is sent to the comparison unit 22 and stored in the second memory 25.

In step S102, the comparison unit 22 compares, for each frequency component, the magnitude relationship between the power spectrum at the time of the current learning and the power spectrum at the time of the immediately preceding learning, which are calculated by the power spectrum calculating unit 21. As a result of comparison by the comparison unit 22 in step S102, in a case that it is determined that there exists a frequency component for which a power spectrum at the time of the current learning is greater than the power spectrum at the time of the immediately preceding learning, the process proceeds to step S103. On the other hand, as a result of comparison by the comparison unit 22 in step S102, in a case that it is determined that there exists no frequency component for which the power spectrum at the time of the current learning is greater than the power spectrum at the time of the immediately preceding learning, the learning correction amount is not updated, and the learning correction amount updating process ends. After completion of the learning correction amount updating process, the learning correction amount updating process may be executed again at the time of next learning.

In step S103, the learning correction amount updating unit 23 advances the phase in a predetermined increment with respect to a frequency component, of the learning correction amount used for correcting the operation command at the time of the current learning, which corresponds to the frequency component at the time of the current leaning having a power spectrum greater than the power spectrum at the time of the immediately preceding learning. Details of the phase advance amount process will be described later.

In step S104, the comparison unit 22 compares, for each frequency component, the magnitude relationship between the power spectrum at the time of the current learning and the power spectrum at the time of the immediately preceding learning, which are calculated by the power spectrum calculating unit 21. As a result of comparison by the comparison unit 22 in step S104, in a case that it is determined that there exists a frequency component for which a power spectrum at the time of the current learning is greater than the power spectrum at the time of the immediately preceding learning, the process returns to step S103. On the other hand, as a result of comparison by the comparison unit 22 in step S104, in a case that it is determined that the power spectrum at the time of the current learning is less than the power spectrum at the time of the immediately preceding learning for all frequencies, the process proceeds to step S105.

In step S105, the learning correction amount updating unit 23 sets the learning correction amount after phase adjustment as a new learning correction amount to be used for correcting the operation command at the time of next learning, and thereafter, completes the learning correction amount updating process. After completion of the learning correction amount updating process, the learning correction amount updating process may be executed again at the time of next learning.

As described above, by a series of processes of the learning correction amount updating unit 23 in steps 103 to 105, the phase is advanced by a sequentially increasing phase advance amount in a predetermined increment with respect to a frequency component, of the learning correction amount used for correcting the operation command at the time of the current learning, which corresponds to a frequency component having a power spectrum at the time of the current learning greater than the power spectrum at the time of the immediately preceding learning, and the phase advance amount is calculated in a case that the power spectrum for the frequency component becomes less than the power spectrum at the time of the immediately preceding learning. The learning correction amount updating unit 23 sets the learning correction amount in which the phase of the frequency component is advanced by the calculated advance amount as a new learning correction amount used for correcting the operation command at the time of next learning.

The new learning correction amount used for correcting the operation command at the time of next learning which is set in step S105 is a learning correction amount obtained by performing adjustment to advance the phase of the learning correction amount at the time of the current learning such that the power spectrum of all the frequency components becomes equal to or less than the power spectrum at the time of the immediately preceding learning. In a case that the new learning correction amount thus adjusted in phase is used to correct the operation command at the time of next learning, the phase delay near the resonance frequency of the control target portion 101 can be compensated to remove the vibration of the control target portion 101 by the learning control unit 11 designed in advance on the basis of the frequency response data for the representative end effector.

On the other hand, in step S102, in a case that the comparison unit 22 determines that there exists no frequency component for which the power spectrum at the time of the current learning is greater than the power spectrum at the time of the immediately preceding learning, since the resonance frequency of the control target portion 101 is greater than the control band of the learning control unit 11, the vibration of the control target portion 101 can be eliminated even in a case where the learning correction amount at the time of the current learning of the learning control unit 11 (which is designed in advance on the basis of the frequency response data for a representative end effector) is used as it is to correct the operation command at the time of next learning, so that the learning correction amount updating process is completed without an update of the learning correction amount.

Next, embodiments of the learning correction amount updating unit 23 will be listed.

Figure 12:
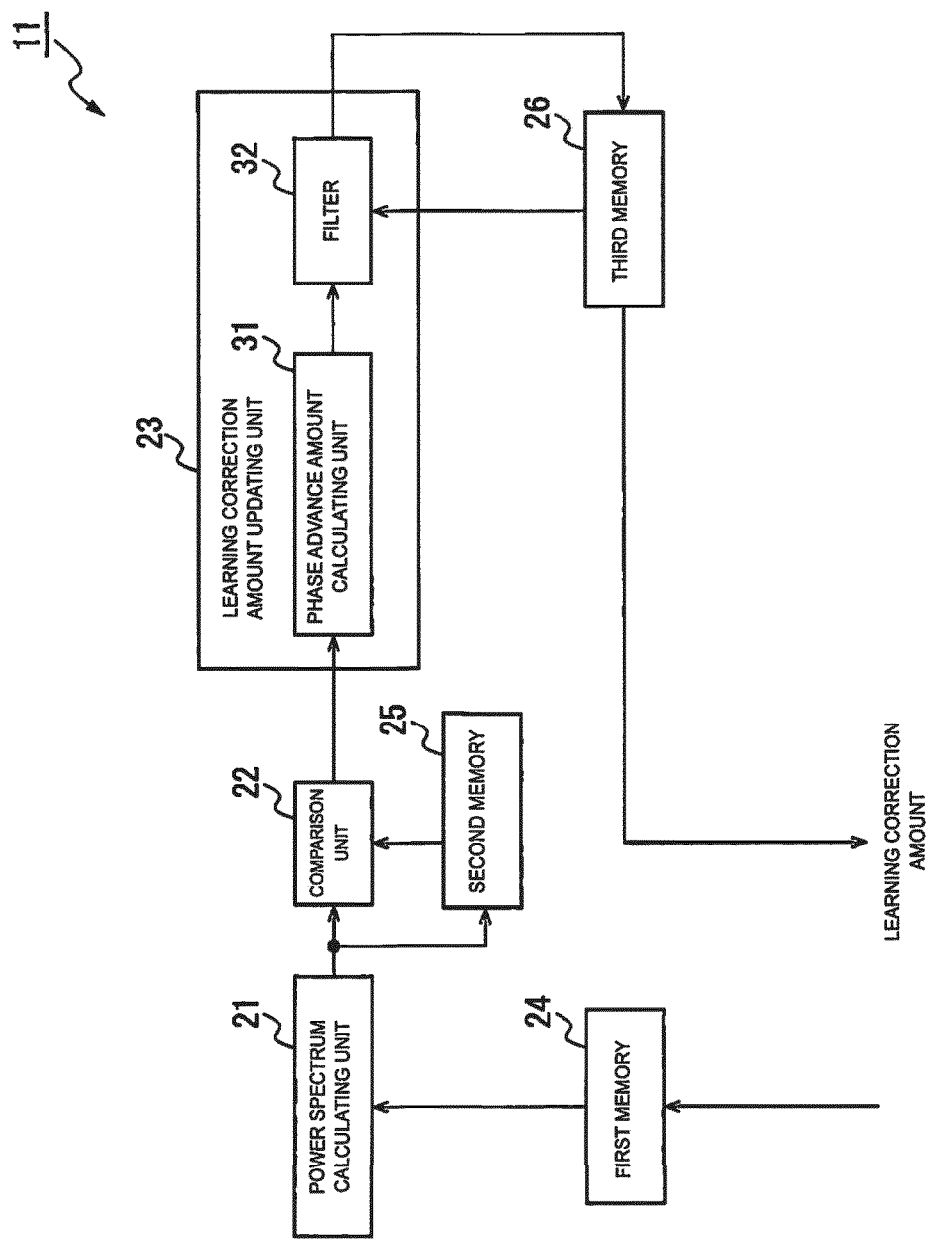
FIG. 12 is a block diagram illustrating a learning control unit including a learning correction amount updating unit according to a first embodiment.

FIG. 12 is a block diagram illustrating a learning control unit including a learning correction amount updating unit according to a first embodiment. The learning correction amount updating unit 23 according to the first embodiment includes a phase advance amount calculating unit 31 and a filter 32 configured to advance the phase with respect to a specific frequency component of the learning correction amount.

As a result of comparison by the comparison unit 22, in a case that there exists a frequency component for which the power spectrum at the time of the current learning is greater than the power spectrum at the time of the immediately preceding learning, the phase advance amount calculating unit 31 advances the phase by a sequentially increasing phase advance amount in a predetermined increment with respect to the frequency component, of the learning correction amount used for correcting the operation command at the time of the current learning, which corresponds to a frequency component at the time of the current leaning having a power spectrum greater than the power spectrum at the time of the immediately preceding learning, and calculates the phase advance amount in a case that the power spectrum of the frequency component becomes less than the power spectrum at the time of the immediately preceding learning. Information on the phase advance amount calculated by the phase advance amount calculating unit 31 is sent to the filter 32.

The filter 32 advances the phase by the phase advance amount calculated by the phase advance amount calculating unit 31 with respect to the frequency component, of the learning correction amount used for correcting the operation command at the time of the current learning, which corresponds to the frequency component at the time of the current leaning having a power spectrum greater than the power spectrum at the time of the immediately preceding learning. The learning correction amount in which the phase of the frequency component is advanced by the filter 32 by the phase advance amount calculated by the phase advance amount calculating unit 31 is set as a new learning correction amount and stored in the third memory 26.

The learning control by the learning correction amount updating unit 23 according to the first embodiment described above can be schematically represented as Equation 1 below in a case that it is expressed by an equation. In Equation 1, $u_i$ represents the learning correction amount for the i-th learning (i is an integer), $e_i$ represents the vibration of the control target portion 101 for the i-th learning, the function $F_p$ represents the application of a filter configured to advance the phase by the phase advance amount, the function Q represents the application of a low-pass filter configured to define the control band of the learning control unit 11, and the function L represents the application of the learning control, respectively.

$$u_{i+1}=Q(F_p u_i + LF_p e_i) \qquad (1)$$

Figure 13:
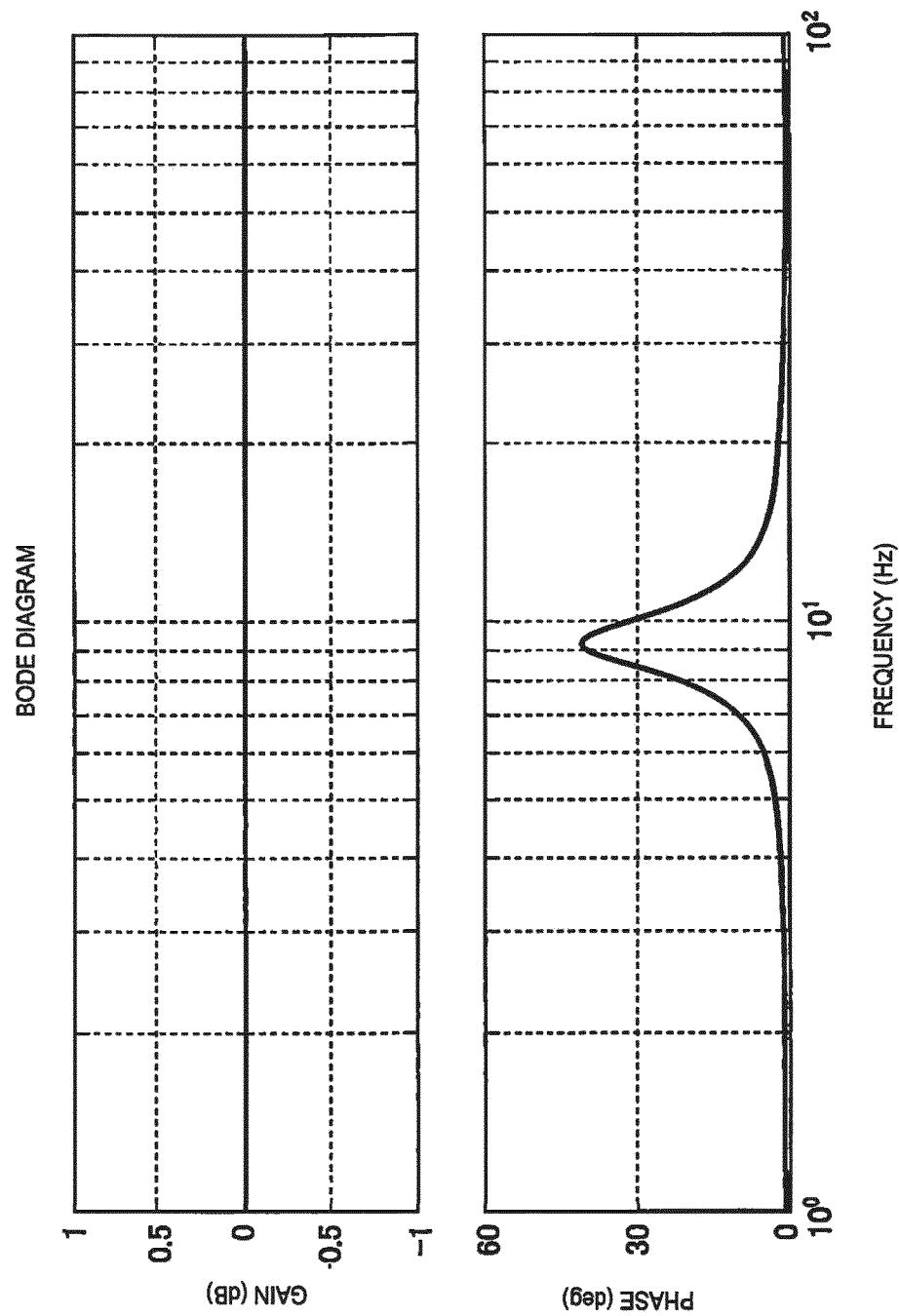
FIG. 13 is a Bode diagram showing an example of the frequency characteristics of a filter in a learning correction amount updating unit according to the first embodiment.

FIG. 13 is a Bode diagram showing an example of the frequency characteristics of a filter in a learning correction amount updating unit according to the first embodiment. For example, at the time of the current learning (i-th time), it is assumed that the power spectrum of vibration increases for frequency components of 8 Hz or greater as compared to the one at the time of the immediately preceding learning (i−1th time). With respect to $u_i$, the phase of the learning correction amount for a specific frequency component is advanced by using the filter 32 having a frequency characteristics as shown in FIG. 13, for example. The robot mechanism unit 103 is operated by the robot control unit 12 by advancing the phase while changing the phase advance amount for the learning correction amount of the specific frequency component in a number of patterns (for example, increasing the phase from 20 degrees in increments of 5 degrees). The phase advance is increased in a predetermined increment until the power spectrum of the vibration for the frequency component of 8 Hz or greater decreases from that in the immediately previous cycle (i−1th). The phase advance amount in a case that the power spectrum of vibration for all frequency components including frequency components of 8 Hz or greater decreases from that in the immediately previous cycle (i−1th) is applied to $F_p$ of the filter 32 in Equation 1, and the learning correction amount $u_i$ of the i-th cycle is replaced with $F_p u_i$, and the learning control is restarted.

Figure 14:
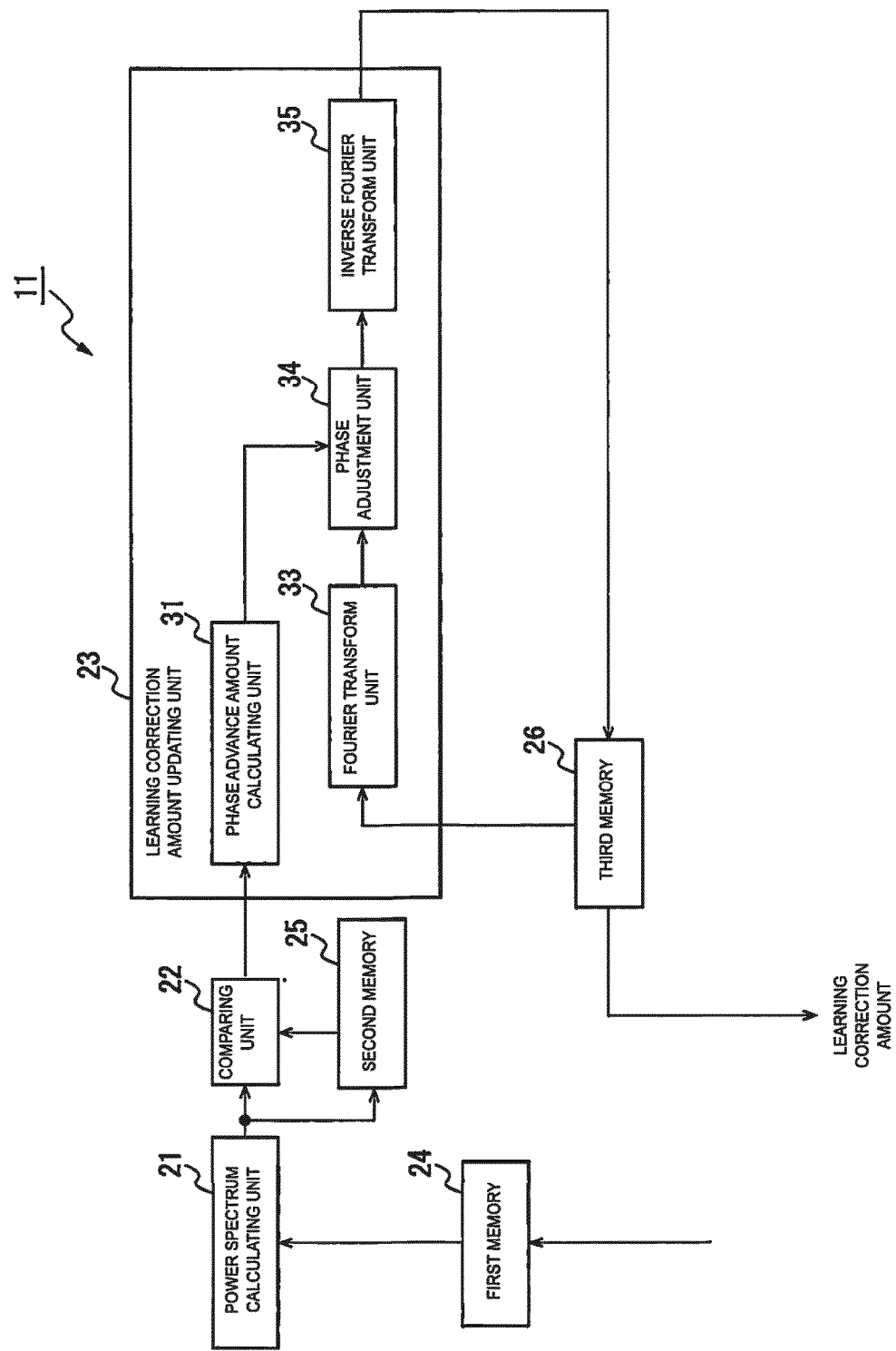
FIG. 14 is a block diagram illustrating a learning control unit including a learning correction amount updating unit according to a second embodiment.

FIG. 14 is a block diagram illustrating a learning control unit including a learning correction amount updating unit according to the second embodiment. The learning correction amount updating unit 23 according to the second embodiment includes a phase advance amount calculating unit 31, a Fourier transform unit 33, a phase adjustment unit 34, and an inverse Fourier transform unit 35.

As a result of comparison by the comparison unit 22, in a case that there exists a frequency component for which the power spectrum at the time of the current learning is greater than the power spectrum at the time of the immediately preceding learning, the phase advance amount calculating unit 31 advances the phase by a sequentially increasing phase advance amount in a predetermined increment with respect to the frequency component, of the learning correction amount used for correcting the operation command at the time of the current learning, which corresponds to a frequency component at the time of the current leaning having a power spectrum greater than the power spectrum at the time of the immediately preceding learning, and calculates the phase advance amount in a case that the power spectrum of the frequency component becomes less than the power spectrum at the time of the immediately preceding learning. Information on the phase advance amount calculated by the phase advance amount calculating unit 31 is sent to the phase adjustment unit 34.

The 33 performs Fourier transform on the learning correction amount read out from the third memory 26, which has been used for correcting the operation command at the time of the current learning. The learning correction amount used for correcting the operation command at the time of the current learning after Fourier transform is sent to the phase adjustment unit 34.

The phase adjustment unit 34 advances the phase by the phase advance amount calculated by the phase advance amount calculating unit 31 with respect to only a frequency component at the time of the current learning, the frequency component having a power spectrum greater than the power spectrum at the time of the immediately preceding learning, of the learning correction amount used for correcting the operation command at the time of the current learning after Fourier transform by the Fourier transform unit 33. The phase advance amount calculated by the phase advance amount calculating unit 31 as described above is intended to make a power spectrum at the time of the current learning less than the power spectrum at the time of the immediately preceding learning with respect to a frequency component, of the learning correction amount at the time of the current learning, which has a power spectrum greater than the power spectrum at the time of the immediately preceding learning. By advancing the phase by the phase advance amount calculated by the phase advance amount calculating unit 31 with respect to a specific frequency component among the frequency components of the learning correction amount, the power spectrum of all the frequency components become less than the power spectrum at the time of the immediately preceding learning. The learning correction amount after phase adjustment by the phase adjustment unit 34 is sent to the inverse Fourier transform unit 35.

The inverse Fourier transform unit 35 performs inverse Fourier transform on the learning correction amount whose phase is advanced by the phase adjustment unit 34 such that the power spectrum of all frequency components become less than the power spectrum at the time of the immediately preceding learning. The learning correction amount after the inverse Fourier transform by the inverse Fourier transform unit 35 is set as a new learning correction amount and stored in the third memory 26.

The learning correction amount updating process by the learning correction amount updating unit 23 according to the above-described second embodiment is represented by Equation 2 below. In Equation 2, W(ω) represents a weighting function for advancing the phase of a specific frequency component in the frequency domain. Assuming that the phase advance amount calculated by the phase advance amount calculating unit 31 is θ, the frequency component whose phase should be advanced is multiplied by $e^{i\theta}$, and the frequency component whose phase need not be advanced is multiplied by 1.

Fourier Transform Phase Adjustment Inverse Fourier Transform $$f(t) \to F(\omega) \to F(\omega)W(\omega) \to f'(t) \qquad (2)$$

$$W(\omega) = \begin{cases} 1 & (\omega \notin \Omega) \\ e^{i\theta} & (\omega \in \Omega) \end{cases}$$

In Equation 2, the learning correction amount f (t) used for correcting the operation command at the time of the current learning in the time domain is Fourier-transformed by the Fourier transform unit 33. The learning correction amount used for correcting the operation command at the time of the current learning after Fourier transform (that is, the learning correction amount used for correcting the operation command at the time of the current learning in the frequency domain) is represented by F(ω). Among the frequency components of the learning correction amount $F(\omega)$ used for correcting the operation command at the current learning time after Fourier transform by the phase adjustment unit 34, the frequency component at the time of the current learning having a power spectrum greater than the power spectrum at the time of the immediately preceding learning is multiplied by $e^{j\theta}$, and a frequency component which does not need to advance the phase is multiplied by 1. The phase-adjusted learning correction amount $F(\omega) W(\omega)$ is inverse Fourier transformed by the inverse Fourier transform unit 35. The learning correction amount after the inverse Fourier transform by the inverse Fourier transform unit 35 (that is, the phase-adjusted learning correction amount in the time domain) is represented by f' (t). With respect to the learning correction amount f' (t) after the inverse Fourier transform by the inverse Fourier transform unit 35, the power spectrum of all frequency components become less than the power spectrum at the time of the immediately preceding learning. Therefore, in a case that the robot control unit 12 corrects the operation command with the new learning correction amount to control the operation of the robot mechanism unit 103, the vibration monotonically decreases for each learning cycle.

Figure 15:
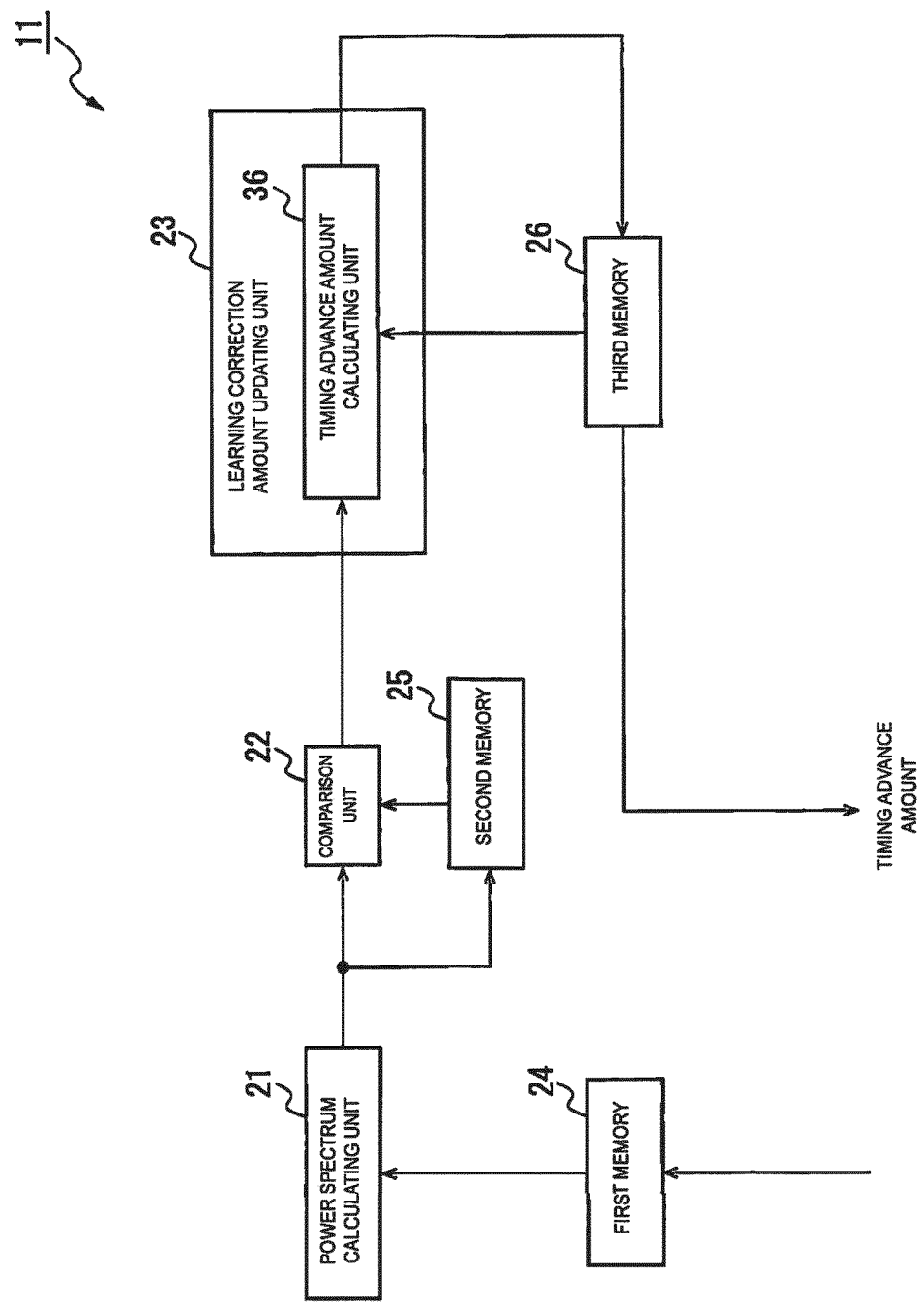
FIG. 15 is a block diagram illustrating a learning control unit including a learning correction amount updating unit according to a third embodiment.

FIG. 15 is a block diagram illustrating a learning control unit including a learning correction amount updating unit according to a third embodiment.

In the first and second embodiments, the phase is advanced only for a specific frequency component (i.e., the frequency component of the learning correction amount corresponding to the frequency component at the time of the current learning, the frequency component having a power spectrum greater than the power spectrum at the time of the immediately preceding learning) among the frequency components of the learning correction amount, so that the power spectrum for all frequency components at the time of the current learning are intended to become less than the power spectrum at the time of the immediately preceding learning. On the other hand, in the third embodiment, not for a specific frequency component among the frequency components of the learning correction amount but the entire learning correction amount (i.e., for all frequency components) is temporally advanced, so that the power spectrum for all frequency components at the time of the current learning are intended to become less than the power spectrum at the time of the immediately preceding learning. Therefore, in the third embodiment, the phase is advanced even for a frequency component, of the learning correction amount used for correcting the operation command at the time of the current learning, which corresponds to the frequency component at the time of the current learning having the power spectrum less than the power spectrum at the time of the immediately preceding learning. However, since at the frequency component at the time of the current leaning having the power spectrum less than the power spectrum at the time of the immediately preceding learning, the power spectrum is only made smaller even in a case where the phase of the learning correction amount at the frequency component is advanced, no particular problem arises.

The learning correction amount updating unit 23 according to the third embodiment includes a timing advance amount calculating unit 36. The timing advance amount calculating unit 36 advances the timing, at which the operation command is corrected, in a predetermined increment by using the learning correction amount at the time of the current learning, and calculates the timing advance amount in a case that the power spectrum at the time of the current learning becomes less than the power spectrum at the time of the immediately preceding learning. Information on the timing advance amount calculated by the timing advance amount calculating unit 36 is stored in the third memory 26. The robot control unit 12 reads out the timing advance amount stored in the third memory 26, corrects the operation command by using a new learning correction amount at the time of next learning at a timing by the timing advance amount earlier than the timing at which the operation command is corrected by using the learning correction amount at the time of the current learning, and controls the operation of the robot mechanism unit 103. Thus, the timing of correcting the operation command by using the new learning correction amount at the time of next learning is made earlier than the timing at which the operation command is corrected by using the learning correction amount at the current learning by the timing advance amount calculated by the timing advance amount calculating unit 36 in the learning correction amount updating unit 23 according to the third embodiment.

Next, an embodiment in which both the phase and the gain of the learning correction amount are adjusted will be described.

In a case that the resonance frequency of the control target portion 101 (end effector) is included in the control band of the learning control unit 11, and the gain of the filter of the learning control unit 11 near this resonance frequency is large, only by adjustment of advancing the phase of the learning correction amount, the power spectrum at the time of the current learning cannot be made less than the power spectrum at the time of the immediately preceding learning, and the vibration may not be able to be reduced. In this case, adjustment is performed to reduce the gain of the filter applied to the learning correction amount.

Figure 16:
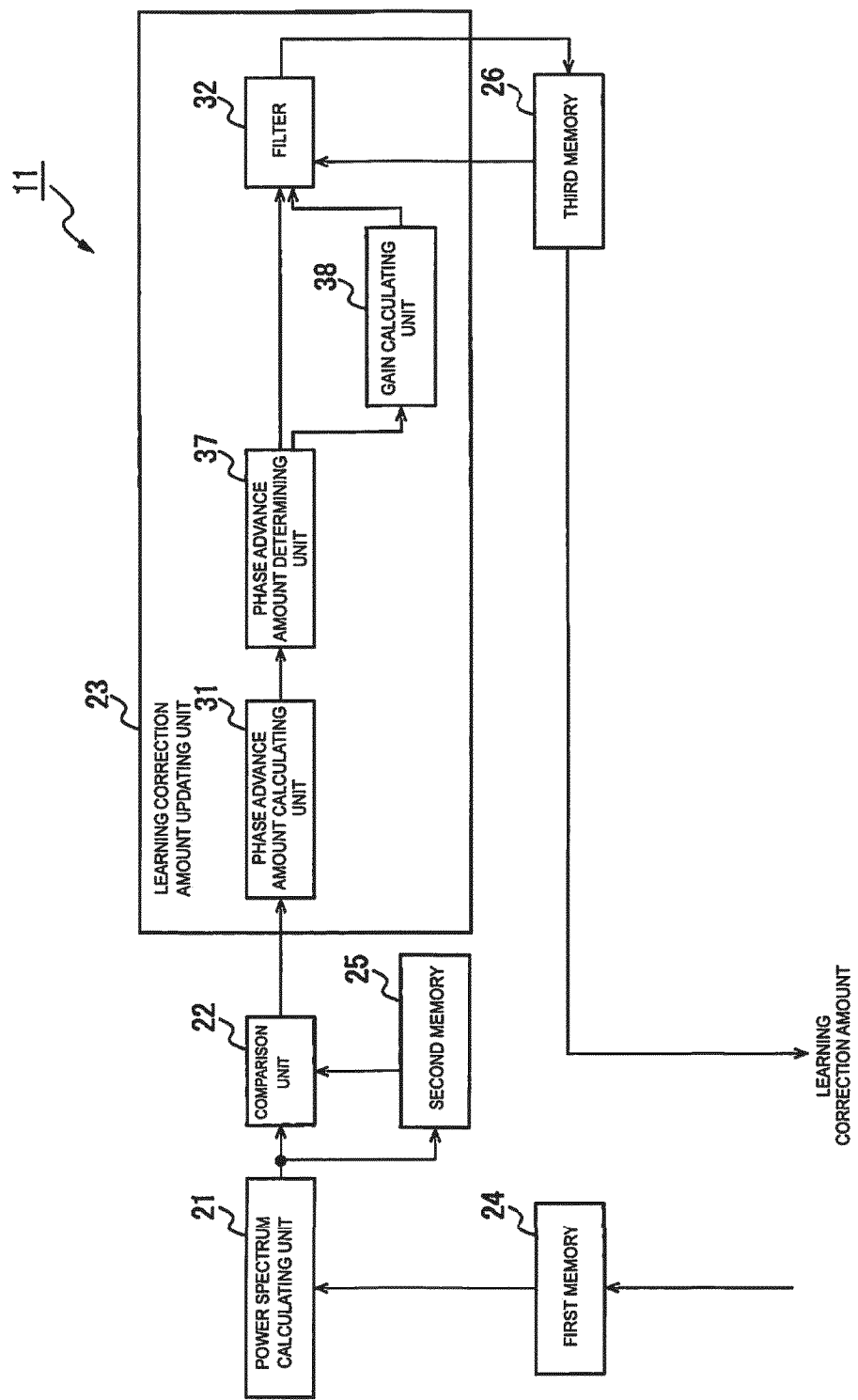
FIG. 16 is a block diagram illustrating a learning control unit including a learning correction amount updating unit according to an embodiment in which both the phase and the gain of the learning correction amount are adjusted.

FIG. 16 is a block diagram illustrating a learning control unit including a learning correction amount updating unit according to an embodiment in which both the phase and the gain of the learning correction amount are adjusted.

As illustrated in FIG. 16, the learning correction amount updating unit 23 includes a phase advance amount calculating unit 31, a filter 32 configured to adjust the phase and gain for a specific frequency component of the learning correction amount, a phase advance amount determining unit 37, and a gain calculating unit 38.

As a result of comparison by the comparison unit 22, in a case that there exists a frequency component for which a power spectrum at the time of the current learning is greater than the power spectrum at the time of the immediately preceding learning, the phase advance amount calculating unit 31 advances the phase by a sequentially increasing phase advance amount in a predetermined increment with respect to the frequency component, of the learning correction amount used for correcting the operation command at the time of the current learning, which corresponds to the frequency component at the time of the current learning having a power spectrum greater than the power spectrum at the time of the immediately preceding learning.

In a case that the phase advance amount calculating unit 31 advances the phase by a sequentially increasing phase advance amount in a predetermined increment with respect to a frequency component, of the learning correction amount used for correcting the operation command at the time of the current learning, which corresponds to a frequency component at the time of the current leaning having a power spectrum greater than the power spectrum at the time of the immediately preceding learning, the phase advance amount determining unit 37 determines whether or not the phase advance amount has reached a predetermined upper limit value before the power spectrum of the frequency component becomes less than the power spectrum at the time of the immediately preceding learning. In a case that the phase advance amount calculating unit 37 can calculate the phase advance amount at the time when the power spectrum of the frequency component becomes less than the power spectrum at the time of the immediately preceding learning before the phase advance amount determining unit 37 determines that the phase advance amount reaches the predetermined upper limit value, the information on the phase advance amount calculated by the phase advance amount calculating unit 31 is sent to the filter 32. On the other hand, in a case that the phase advance amount determining unit 37 determines that the phase advance amount has reached the predetermined upper limit value, the determining result is notified to the gain calculating unit 38. An example of setting of the upper limit value used for the determining process of the phase advance amount calculating unit 31 will be described later.

In response to the determining result that the phase advance amount has reached the predetermined upper limit value determined by the phase advance amount determining unit 37, the gain calculating unit 38 returns the phase advance amount calculated by the phase advance amount calculating unit 31 to zero. Then, the gain calculating unit 38 decreases the gain of the filter 32 applied to the learning correction amount used for correcting the operation command at the time of the current learning in a predetermined increment and calculates the gain of the filter 32 at the time when the power spectrum of the frequency component becomes less than the power spectrum at the time of the immediately preceding learning. Information on the gain calculated by the gain calculating unit 38 is sent to the filter 32.

In a case that the phase advance amount can be calculated in a case that the power spectrum of the frequency component becomes less than the power spectrum at the time of the immediately preceding learning before the phase advance amount determining unit 37 determines that the phase advance amount has reached the predetermined upper limit value, the filter 32 advances the phase by the phase advance amount calculated by the phase advance amount calculating unit 31 with respect to the frequency component, of the learning correction amount used for correcting the operation command at the time of the current learning, which corresponds to the frequency component at the time of the current learning having the power spectrum greater than the power spectrum at the time of the immediately preceding learning. In this case, the learning correction amount, of which the phase of the frequency component has been advanced by the filter 32 by the phase advance amount calculated by the phase advance amount calculating unit 31, is set as a new learning correction amount, and is stored in the third memory 26.

On the other hand, in a case that the phase advance amount determining unit 37 determines that the phase advance amount has reached a predetermined upper limit value, the learning correction amount, to which the filter 32 having the gain calculated by the gain calculating unit 38 is applied, is set as a new learning correction amount (i.e., the learning correction amount of which the peak of the frequency component is reduced) in the filter 32 and stored in the third memory 26.

The learning control by the learning correction amount updating unit 23 according to the embodiment, in which both the phase and the gain of the learning correction amount described above are adjusted, can be schematically represented as Equation 3 below. In Equation 3, $u_i$ represents the learning correction amount for the i-th learning (i is an integer), $e_i$ represents the vibration of the control target portion 101 for the i-th learning, and the function $F_p$ represents the application of a filter configured to advance the phase by the phase advance amount, the function $F_g$ represents the application of a filter configured to decrease the gain by the phase advance amount, the function Q represents the application of a low-pass filter configured to define the control band of the learning control unit 11, and the function L represents the application of the learning control, respectively.

$$u_{i+1} = Q(F_p F_g u_i + L F_p F_g e_i) \quad (3)$$

Figure 17:
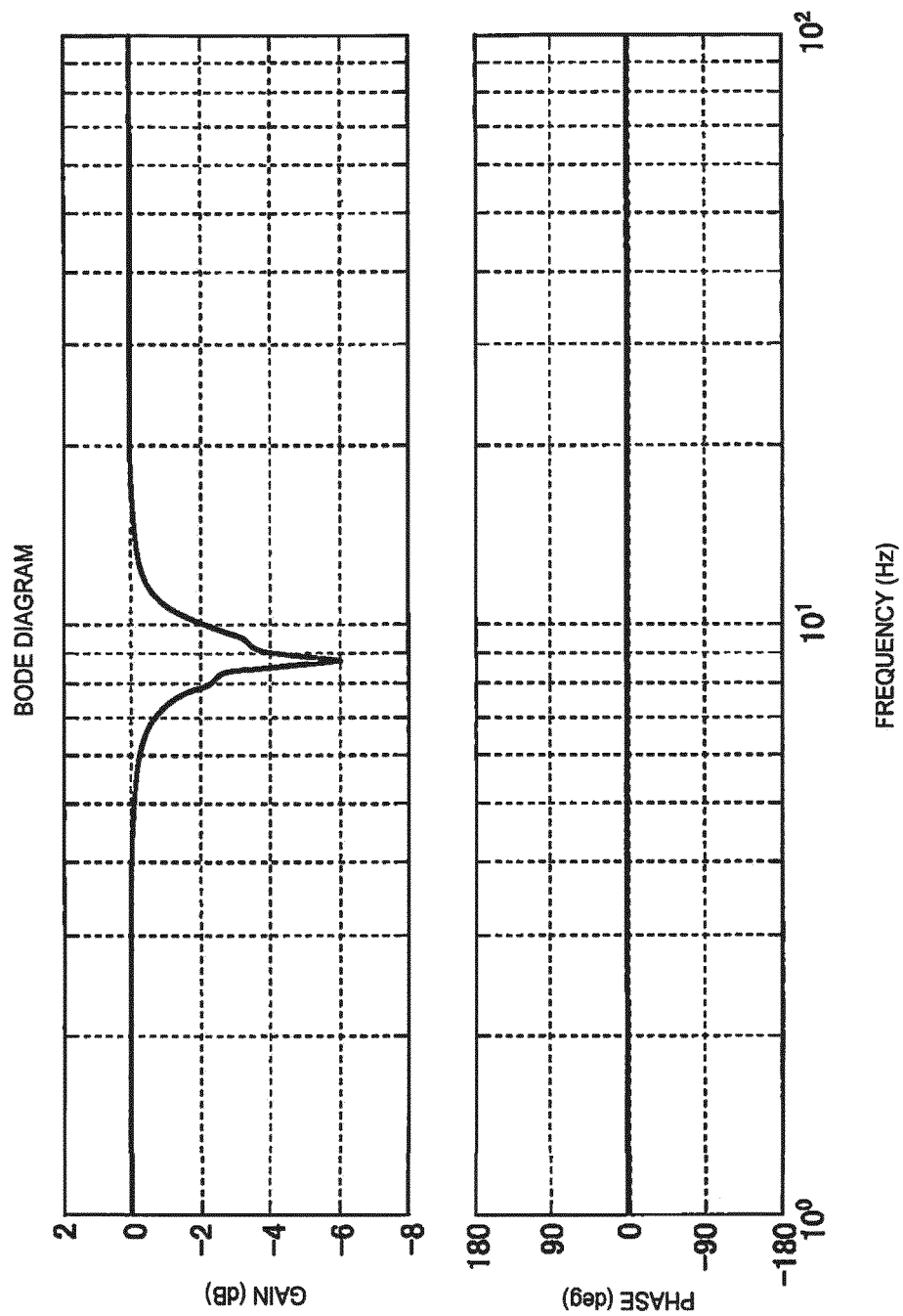
FIG. 17 is a Bode diagram showing an example of the frequency characteristics of a filter configured to adjust the gain of a learning correction amount.

FIG. 17 is a Bode diagram showing an example of the frequency characteristics of a filter configured to adjust the gain of a learning correction amount. In a case that the peak of the power spectrum of the vibration is large for a certain frequency component, the phase of the learning correction amount $u_i$ for the specific frequency component is advanced by using the filter 32 having the frequency characteristics as shown in FIG. 17, for example. In the example of FIG. 17, the frequency characteristics of the filter 32 for reducing the peak of a frequency component of 9 Hz is shown as an example. The robot control unit 12 operates the robot mechanism unit 103 by advancing the phase while changing the gain of the filter 32 in several patterns applied to the learning correction amount for a specific frequency component. The gain of the filter 32 is decreased in a predetermined increment until the power spectrum of the vibration for all frequency components decreases from that of the immediately previous cycle (i–1th). The gain in a case that the power spectrum of vibration for all frequency components is decreased from that of the previous time (i–1th) is applied to the filter $F_p F_g$ in Equation 3, and the learning correction amount $u_i$ of the i-th leaning is replaced with $F_p F_g u_i$, and the learning control is restarted.

The upper limit value used for the determining process of the phase advance amount calculating unit 31 may be set to, for example, the following value. That is, the phase difference between the first value obtained by Fourier transforming the "L $(e_i - e_{i-1})$" in which the learning control is applied to the difference between the vibration $e_i$ of the i-th learning and the vibration $e_{i-1}$ of the i–1th learning, and the second value obtained by Fourier transforming the difference "$u_i - u_{i-1}$" between the learning correction amount $u_i$ of the i-th learning and the learning correction amount $u_{i-1}$ of the i–1th learning is set to the upper limit value used in the determining process of the phase advance calculating unit 31. The learning control unit 11 is designed on the basis of the frequency response data for a representative control target portion, not for the actual control target portion 101 of the robot mechanism unit 103. In a case that the resonance frequency of the actual control target portion 101 of the robot mechanism unit 103 is included within the control band of the learning control unit 11 (in a case that there exists a frequency component for which a power spectrum at the time of the current learning is greater than the power spectrum at the time of previous learning), the vibration of the control target portion 101 may sometimes not be eliminated even in a case where the phase of the frequency component of the characteristic of the learning correction amount is advanced (i.e., vibration is diverged). This is because the first value (the vibration difference after application of learning control in the frequency domain) exceeds the second value (difference in the learning correction amount in the frequency domain) no matter how much the phase is advanced. In such a case, it is necessary to switch to the adjustment to reduce the gain of the filter to be applied to the learning correction amount, instead of the adjustment by the phase advance of the leaning correction amount, and as a measure of the switching of the adjustment method, the phase difference between the first value obtained by Fourier transforming the "L $(e_i-e_{i-1})$" in which the learning control is applied to the difference between the l vibration $e_i$ of the i-th learning and the vibration $e_{i-1}$ of the i–1th learning, and the second value obtained by Fourier transforming the difference "$u_i-u_{i-1}$" between the learning correction amount $u_i$ of the i-th learning and the learning correction amount $u_{i-1}$ of the i–1th learning, is set to the upper limit value.

Figure 18:
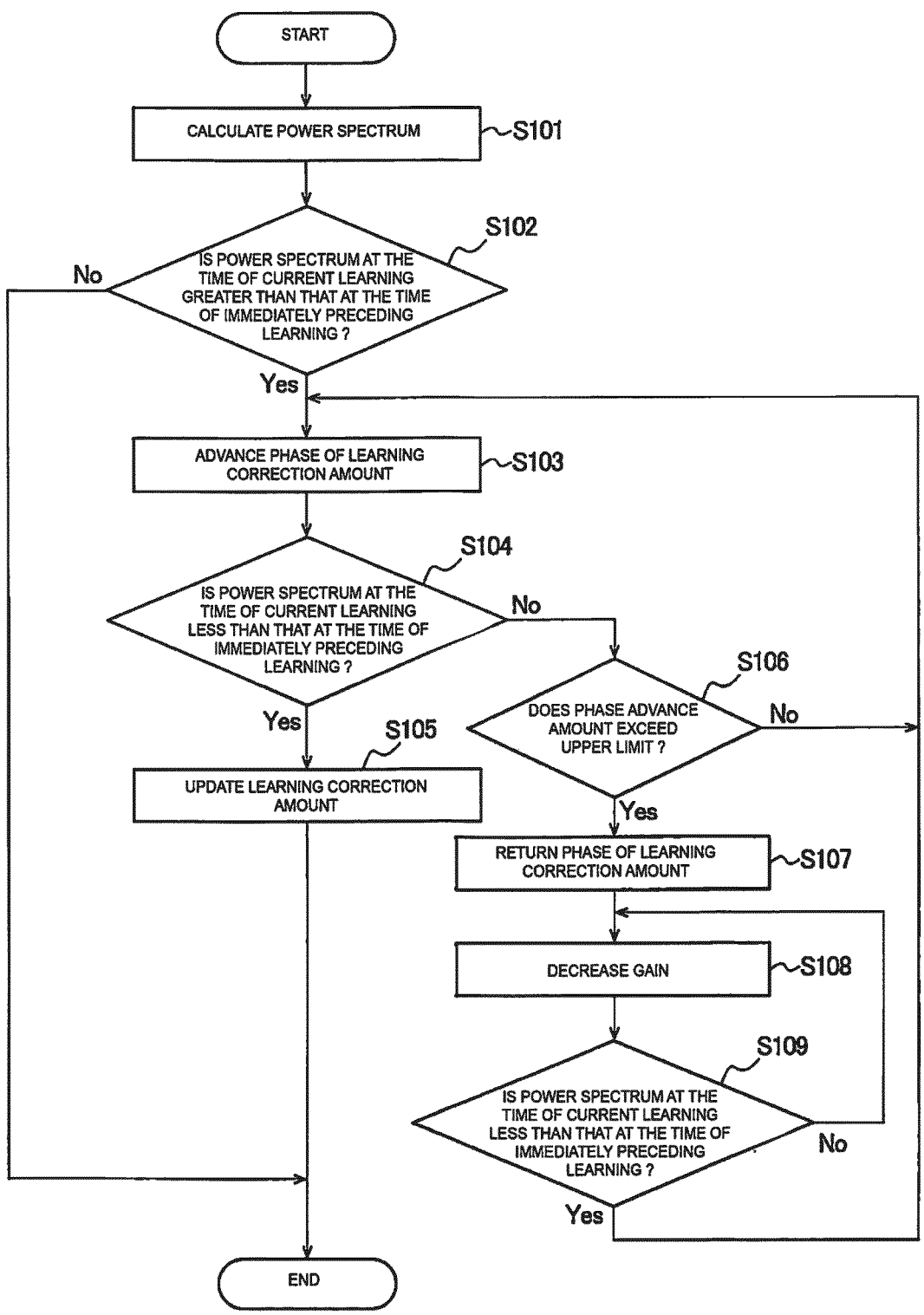
FIG. 18 is a flow chart illustrating a learning correction amount updating process according to an embodiment in which both the phase and the gain of the learning correction amount are adjusted.

FIG. 18 is a flow chart illustrating a learning correction amount updating process according to an embodiment in which both the phase and the gain of the learning correction amount are adjusted.

A case is considered in which the robot control unit 12 controls the operation of the robot mechanism unit 103 by correcting the operation command by using the learning correction amount calculated by the learning control unit 11. In step S101, the power spectrum calculating unit 21 performs Fourier-transform on the vibration data detected by the sensor 102 to calculate a power spectrum. The power spectrum calculated by the power spectrum calculating unit 21 is sent to the comparison unit 22 and stored in the second memory 25.

In step S102, the comparison unit 22 compares, for each frequency component, the power spectrum at the time of the current learning and the power spectrum at the time of the immediately preceding learning, calculated by the power spectrum calculating unit 21. In step S102, in a case that the comparison unit 22 determines that there exists a frequency component for which a power spectrum at the time of the current learning is greater than the power spectrum at the time of previous learning, the process proceeds to step S103. On the other hand, in step S102, in a case that the comparison unit 22 determines that there does not exist a frequency component for which a power spectrum at the time of the current learning is greater than the power spectrum at the time of previous learning, the learning correction amount is not updated, and the learning correction amount updating process ends. After completion of the learning correction amount updating process, the learning correction amount updating process may be executed again at the time of next learning.

In step S103, the learning correction amount updating unit 23 advances the phase in a predetermined increment with respect to a frequency component, of the learning correction amount used for correcting the operation command at the time of the current learning, which corresponds to a frequency component at the time of the current leaning having a power spectrum greater than the power spectrum at the time of the immediately preceding learning.

In step S104, the comparison unit 22 compares, for each frequency component, the power spectrum at the time of the current learning and the power spectrum at the time of the immediately preceding learning, calculated by the power spectrum calculating unit 21. In step S104, in a case that the comparison unit 22 determines that there exists a frequency component for which a power spectrum at the time of the current learning is greater than the power spectrum at the time of the immediately preceding learning, the process proceeds to step S106. On the other hand, in step S104, in a case that the comparison unit 22 determines that for all frequency components the power spectrum at the time of the current learning are less than the power spectrum at the time of the immediately preceding learning, the process proceeds to step S105.

In step S105, the learning correction amount updating unit 23 sets the learning correction amount after phase adjustment or phase and gain adjustment as a new learning correction amount to be used for correcting the operation command at the time of next learning, and thereafter, completes the learning correction amount updating process. After completion of the learning correction amount updating process, the learning correction amount updating process may be executed again at the time of next learning.

In step S106, with respect to a frequency component, of the learning correction amount used for correcting the learning correction amount, which corresponds to the frequency component at the time of the current learning with a power spectrum greater than the power spectrum at the time of the immediately preceding learning, the phase advance amount determining unit 37 determines whether the phase advance amount has reached a predetermined upper limit value before the power spectrum of the frequency component becomes less than the power spectrum at the time of the immediately preceding learning. In step S106, in a case that the phase advance amount determining unit 37 determines that the phase advance amount has reached the predetermined upper limit value, the processing proceeds to step S107. On the other hand, in step S106, in a case that the phase advance amount determining unit 37 determines that the phase advance amount has not reached the predetermined upper limit value, the processing returns to step S103. In a case that the phase advance amount calculating unit 31 advances the phase by a sequentially increasing phase advance amount in a predetermined increment in step S103, as long as the comparison unit 22 determines in step 104 that there exists a frequency component for which a power spectrum at the time of the current learning is greater than the power spectrum at the time of the immediately preceding learning, the determination process in step S106 is repeated.

In step S107, the gain calculating unit 38 returns the phase advance amount calculated by the phase advance amount calculating unit 31 to zero.

In step S108, the gain calculating unit 38 decreases in a predetermined increment the gain of the filter 32 applied to the learning correction amount used for correcting the operation command at the time of the current learning.

In step S109, the comparison unit 22 compares, for each frequency component, the power spectrum at the time of the current learning and the power spectrum at the time of the immediately preceding learning, calculated by the power spectrum calculating unit 21.

In step S109, in a case that the comparison unit 22 determines that there exists a frequency component for which a power spectrum at the time of the current learning is greater than the power spectrum at the time of the immediately preceding learning, the process returns to step S108.

On the other hand, in a case that the comparison unit 22 determines that for all frequency components, the power spectrum at the time of the current learning is less than the power spectrum at the time of the immediately preceding learning in step S109, the gain calculated by the gain calculating unit 38 at that time is held, and the process returns to step S103. In step S103, the filter 32 is operated with the newly held gain, and the process of step S103 (the process of advancing the phase of the learning correction amount) is performed again.

The new learning correction amount used for correcting the operation command at the time of next learning, which is set in step 105 after the processing in steps 101 to 106, is the learning correction amount obtained by performing adjustment to advance the phase of the learning correction amount at the time of the current learning such that the power spectrum of all the frequency components becomes equal to or less than the power spectrum at the time of the immediately preceding learning. In a case that the new learning correction amount thus adjusted in phase is used to correct the operation command at the time of next learning, the phase delay near the resonance frequency of the control target portion 101 can be compensated to remove the vibration of the control target portion 101 by the learning control unit 11 which is designed in advance on the basis of the frequency response data for the representative end effector.

The new learning correction amount used for correcting the operation command at the time of next learning, which is set in step 105 after the processing in steps 101 to 109, is the learning correction amount obtained by adjusting to make the gain smaller while advancing the phase of the learning correction amount at the time of the current learning such that the power spectrum of all the frequency components becomes equal to or less than the power spectrum at the time of the immediately preceding learning. In a case that the new learning correction amount thus adjusted in phase and gain is used to correct the operation command at the time of next learning, the influence of the phase delay and the gain increase near the resonance frequency of the control target portion 101 can be compensated to remove the vibration of the control target portion 101 by the learning control unit 11 which is designed in advance on the basis of the frequency response data for the representative end effector.

On the other hand, in step S102, in a case that the comparison unit 22 determines that there exists no frequency component for which the power spectrum at the time of the current learning is greater than the power spectrum at the time of the immediately preceding learning, since the resonance frequency of the control target portion 101 is greater than the control band of the learning control unit 11, the vibration of the control target portion 101 can be eliminated even in a case where the learning correction amount at the time of the current learning of the learning control unit 11 (which is designed in advance on the basis of the frequency response data for a representative end effector), is used as it is to correct the operation command at the time of next learning, so that the learning correction amount updating process is completed without an update of the learning correction amount.

In this manner, according to the embodiment of the present disclosure, even in a case where the rigidity of the control target portion (end effector) is low, and the resonance frequency is included within the control band of the learning control unit, the vibration of the control target portion can be accurately eliminated by using the learning control unit designed in advance on the basis of the frequency response data for the representative control target portion. Therefore, even in a case where the rigidity of the control target portion is low, there is no need to obtain the frequency response data at the actual control target portion in the field to redesign the learning control unit, so that the frequency response data for the representative control target portion can be diverted, and the elimination of the vibration of the control target portion can be realized easily and at low cost.

The power spectrum calculating unit 21, the comparison unit 22, the learning correction amount updating unit 23, and the robot control unit 12 described above may be constructed, for example, in a software program format or may be constructed by a combination of various electronic circuits and a software program. In this case, the functions of the respective units can be realized by causing an arithmetic processing unit such as an ASIC or DSP to execute the software program. Alternatively, it may be realized as a semiconductor integrated circuit in which a software program for realizing the functions of the power spectrum calculating unit 21, the comparison unit 22, the learning correction amount updating unit 23, and the robot control unit 12 is written.

According to one aspect of the present disclosure, it is possible to realize a robot system capable of accurately and easily removing the vibration of a control target portion by learning control.

The invention claimed is:

1. A robot system having a robot mechanism unit including a sensor configured to acquire vibration data of a control target portion and a robot control device configured to control an operation of the robot mechanism unit according to an operation program, comprising
a learning control unit configured to perform learning for calculating a learning correction amount for bringing a position of the control target portion detected by the sensor toward a target position while the robot mechanism unit operates according to the operation program, and
a robot control unit configured to correct an operation command regarding the target position of the control target portion by using the learning correction amount calculated by the learning control unit and to control the operation of the robot mechanism unit according to the operation program,
wherein the learning control unit includes
a power spectrum calculating unit configured to calculate a power spectrum by Fourier transforming vibration data detected by the sensor for each learning cycle by the learning control unit,
a comparison unit configured to compare for each frequency component a power spectrum at the time of the current learning with a power spectrum at the time of the immediately preceding learning, which are calculated by the power spectrum calculating unit, and
a learning correction amount updating unit, in a case that as a result of comparison by the comparison unit, there exists a frequency component for which the power spectrum at the time of the current learning is greater than the power spectrum at the time of the immediately preceding learning, configured to adjust at least one of a phase and a gain of the learning correction amount used for correcting the operation command at the time of the current learning such that the power spectrum at the time of the current learning becomes less than the power spectrum at the time of the immediately preceding learning and to set the adjusted learning correction amount as a new learning correction amount used for correcting an operation command at the time of next learning.

2. The robot system according to claim 1,
wherein the learning correction amount updating unit includes
a phase advance amount calculating unit configured to advance a phase by sequentially increasing a phase advance amount in a predetermined increment with respect to a frequency component of the learning correction amount used at the time of the current learning, wherein the frequency component of the learning correction amount corresponds to the frequency component at the time of the current learning having the power spectrum greater than the power spectrum at the time of the immediately preceding learning, and calculate the phase advance amount in response to the power spectrum of the frequency component becoming less than the power spectrum at the time of the immediately preceding learning, and the learning correction amount, with the phase of the frequency component advanced by the phase advance amount calculated by the phase advance amount calculating unit, is set as the new learning correction amount.

3. The robot system according to claim 2, wherein the learning correction amount updating unit includes a filter configured to advance a phase with respect to a specific frequency component of the learning correction amount, and the learning correction amount, with the phase of the frequency component advanced by the filter by the phase advance amount calculated by the phase advance amount calculating unit, is set as the new learning correction amount.

4. The robot system according to claim 2, wherein the learning correction amount updating unit includes a Fourier transform unit configured to Fourier transform the learning correction amount used at the time of the current learning, a phase adjustment unit configured to advance the phase by the phase advance amount calculated by the phase advance amount calculating unit with respect to only a frequency component at the time of the current learning of the learning correction amount used at the time of the current learning after Fourier transform by the Fourier transform unit, the frequency component at the time of the current learning of the learning correction amount having the power spectrum greater than the power spectrum at the time of the immediately preceding learning, and an inverse Fourier transform unit configured to perform inverse Fourier transform on the learning correction amount with the phase of the frequency component advanced by the phase adjustment unit, wherein the learning correction amount after the inverse Fourier transform by the inverse Fourier transform unit is set as the new learning correction amount.

5. The robot system according to claim 1, wherein the learning correction amount updating unit includes a timing advance amount calculating unit configured to advance a timing in a predetermined increment at which the operation command is corrected by using the learning correction amount used at the time of the current learning, and calculate a timing advance amount in response to the power spectrum at the time of the current learning becoming less than the power spectrum at the time of the immediately preceding learning, and the robot control unit is configured to correct the operation command by using the new learning correction amount for the next learning at a timing earlier by the timing advance amount calculated by the timing advance amount calculating unit than the timing at which the operation command is corrected by using the learning correction amount used at the time of the current learning, and control an operation of the robot mechanism unit.

6. The robot system according to claim 2, wherein the learning correction amount updating unit includes a phase advance amount determining unit configured to, in response to the phase advance amount calculating unit advancing the phase by sequentially increasing the phase advance amount in the predetermined increment with respect to the frequency component of the learning correction amount used at the time of the current learning, wherein the frequency component of the learning correction amount corresponds to the frequency component at the time of the current learning having the power spectrum greater than the power spectrum at the time of the immediately preceding learning, determine whether the phase advance amount reached a predetermined upper limit value before the power spectrum of the frequency component becomes less than the power spectrum at the time of the immediately preceding learning, and a gain calculating unit configured to, in response to the phase advance amount determining unit determining that the phase advance amount reaches the predetermined upper limit value, return the phase advance amount to zero, decrease a gain of a filter in a predetermined increment, the gain being applied to the learning correction amount used at the time of the current learning, and calculate the gain of the filter in response to the power spectrum of the frequency component becoming less than the power spectrum at the time of the immediately preceding learning, wherein the filter including the gain calculated by the gain calculating unit is applied to the learning correction amount used at the time of the current learning, and the applied learning correction amount is set as the new learning correction amount.

7. The robot system according to claim 1, wherein the sensor includes an acceleration sensor, a gyro sensor, an inertial sensor, a force sensor, a laser tracker, a camera or a motion capture.

8. The robot system according to claim 1, wherein the learning control unit is provided in the robot control device or in a computer connected to the robot control device via a wired or a wireless connection.

9. A robot system comprising:

a robot mechanism unit including a sensor configured to acquire vibration data of a control target portion; and a robot controller configured to control an operation of the robot mechanism unit according to an operation program, perform learning for calculating a learning correction amount for bringing a position of the control target portion detected by the sensor toward a target position while the robot mechanism unit operates according to the operation program, correct an operation command regarding the target position of the control target portion using the learning correction amount, and control the operation of the robot mechanism unit according to the operation program, the robot controller including a processor configured to
calculate a power spectrum by Fourier transforming vibration data detected by the sensor for each learning cycle,
compare for each frequency component a power spectrum at a time of current learning with a power spectrum at a time of immediately preceding learning, and
in response to, as a result of comparison, a frequency component for which the power spectrum at the time of current learning being greater than the power spectrum at the time of immediately preceding learning,
adjust at least one of a phase and a gain of the learning correction amount used for correcting an operation command at the time of current learning to cause the power spectrum at the time of current learning to become less than the power spectrum at the time of immediately preceding learning, and
set the adjusted learning correction amount as a new learning correction amount used for correcting an operation command at a time of next learning.

* * * * *